United States Patent [19]

Kazami et al.

[11] Patent Number: 5,576,785
[45] Date of Patent: Nov. 19, 1996

[54] FILM FEEDING CONTROL DEVICE FOR ACCURATE ALIGNMENT OF FILM FRAMES AND CAMERA APERTURE

[75] Inventors: Kazuyuki Kazami; Norikazu Yokonuma, both of Tokyo, Japan

[73] Assignee: Nikon Corporation, Tokyo, Japan

[21] Appl. No.: 482,557

[22] Filed: Jun. 7, 1995

Related U.S. Application Data

[62] Division of Ser. No. 222,360, Apr. 4, 1994, which is a continuation of Ser. No. 801,905, Dec. 3, 1991, abandoned.

[30] Foreign Application Priority Data

| Dec. 6, 1990 | [JP] | Japan | 2-406295 |
| Dec. 6, 1990 | [JP] | Japan | 2-406296 |
| Dec. 10, 1990 | [JP] | Japan | 2-409808 |

[51] Int. Cl.⁶ ................................ G03B 1/18
[52] U.S. Cl. ............................. 396/397; 396/406
[58] Field of Search .................... 354/173.1, 173.11, 354/213, 215, 217

[56] References Cited

U.S. PATENT DOCUMENTS

| 4,431,292 | 2/1984 | Takahashi | 354/173.11 |
| 4,632,530 | 12/1986 | Iwata et al. | 354/173.11 |
| 4,697,899 | 10/1987 | Kawamura et al. | 354/173.11 |
| 4,980,710 | 12/1990 | Harvey | 354/173.1 |
| 4,996,549 | 2/1991 | Yamaguchi | 354/173.11 |
| 5,008,692 | 4/1991 | Diehl et al. | 354/123.1 |

*Primary Examiner*—Michael L. Gellner
*Assistant Examiner*—J. K. Han
*Attorney, Agent, or Firm*—Shapiro and Shapiro

[57] ABSTRACT

A film feeding cessation adjusting device for cameras is capable of accurately stopping to a predetermined stopping position each frame of a film having a minimum number of perforations in order to ensure a sufficient data recording area. The film feeding cessation adjusting device includes a film feeding device for feeding a film, a perforation detection device for detecting a perforation of the film, a timer device for measuring a time required for film feeding, a stopping signal generating device for obtaining a time which is delayed by a predetermined period from the time at which the perforation detection device detects the perforation, on the basis of the results of the measurement of the timer device, and for generating a feeding stopping signal at the obtained time, and a control device for stopping film feeding of the film feeding device when it receives the feeding stopping signal.

5 Claims, 21 Drawing Sheets

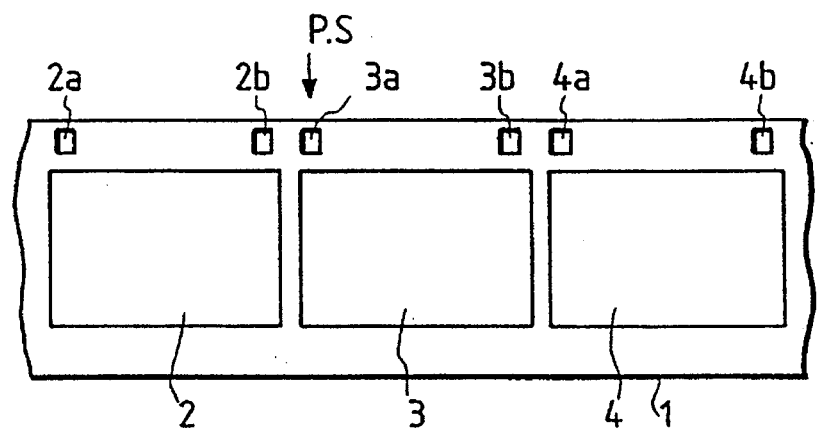
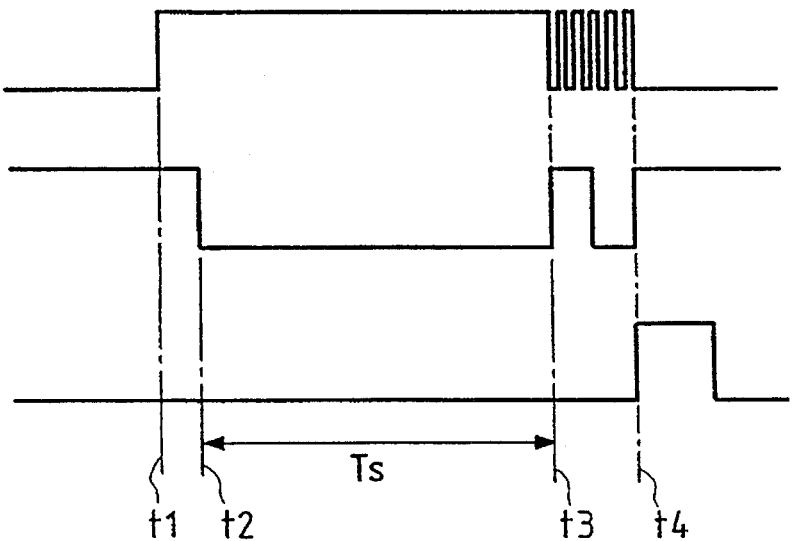

DIRECTION OF FILM FEEDING

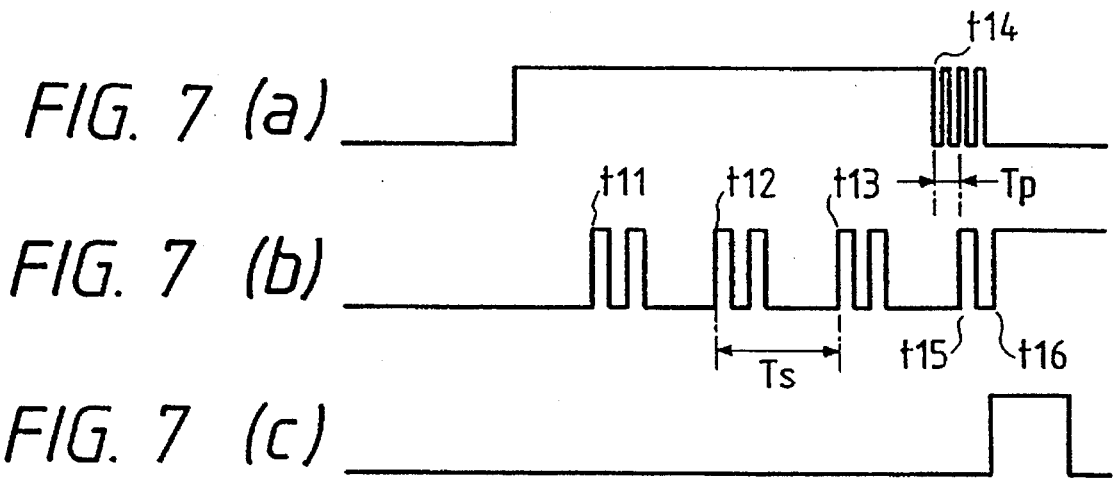
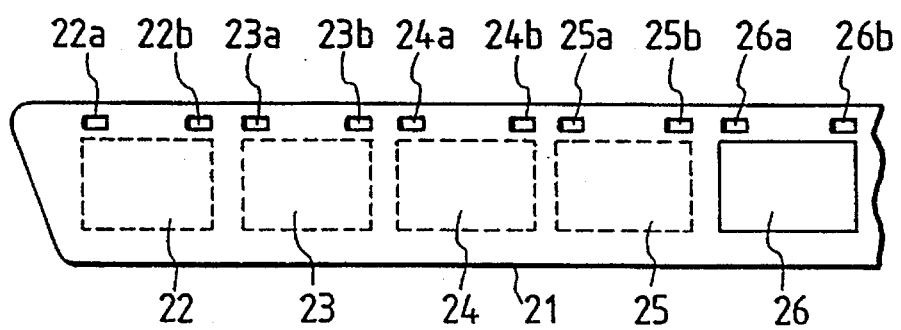

DIRECTION OF FILM FEEDING

DIRECTION OF FILM FEEDING
FIG. 17 (a)
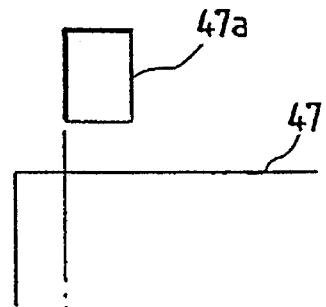
FIG. 17 (b)
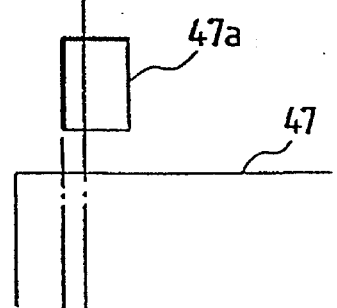
FIG. 17 (c)
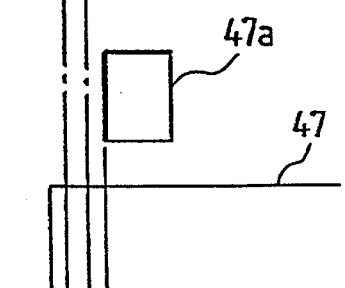
FIG. 17 (d)
FIG. 17 (e)
FIG. 17 (f)
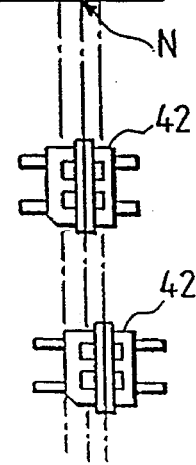

FIG. 19 (a)
FIG. 19 (b)
FIG. 19 (c)
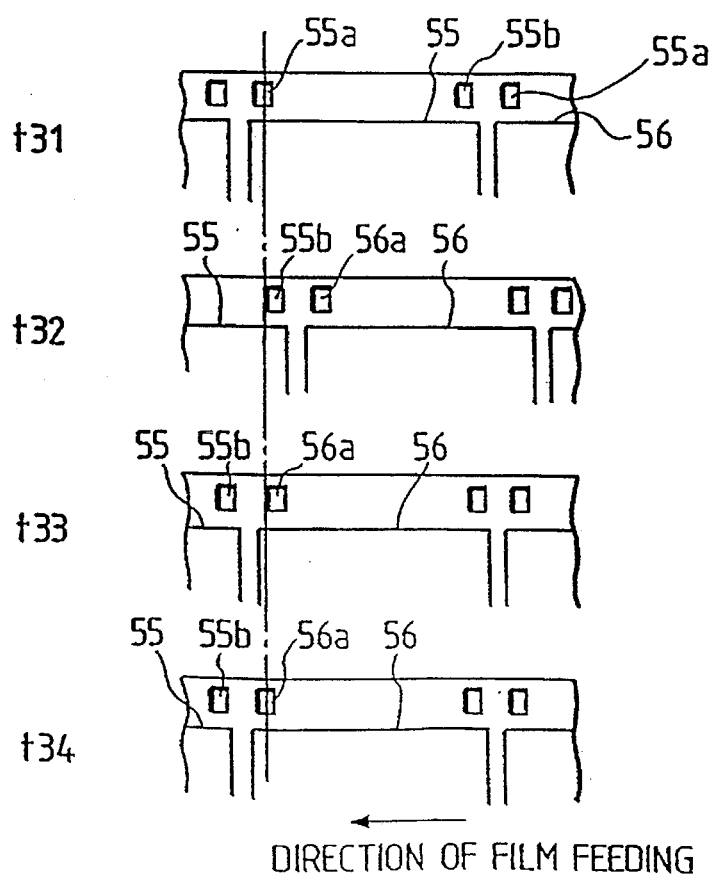
FIG. 20
DIRECTION OF FILM FEEDING

DIRECTION OF FILM FEEDING

| Ts | Td |
|----|----|
| T0 | Td1 |
| T1 | Td2 |
| T2 | Td3 |

TO FIG. 29

FILM FEEDING CONTROL DEVICE FOR ACCURATE ALIGNMENT OF FILM FRAMES AND CAMERA APERTURE

This is a division of application Ser. No. 08/222,360 filed Apr. 4, 1994, which is a continuation of application Ser. No. 07/801,905 filed Dec. 3, 1991 (abandoned).

BACKGROUND OF THE INVENTION

1. Field of the Invention

The present invention relates to a film feeding cessation adjusting device for cameras which is designed to feed individual frames of a film to a predetermined photographic position.

2. Related Background Art

Cameras capable of recording data on a magnetic recording medium coated on a data recording area of a film or reproducing data recorded on the magnetic recording medium are known.

In the film used in such a camera, the data recording area is provided on the portion of the film other than the photographing image plane so that the frames of the film are not damaged when data is recorded or reproduced using a magnetic head or the like. However, the portion of the film other than the photographing image plane has perforations used for feeding the film. In order to provide sufficient data storage capacity, the number of perforations must therefore be reduced as much as possible to provide a large data recording area.

To overcome such a problem, there has been proposed a film 1 shown in FIG. 1 and a device for controlling feeding thereof (see commonly owned U.S. Ser. No. 720,719 filed on Jun. 25, 1991).

In the film 1 shown in FIG. 1, each of the frames on the film 1 has two perforations at predetermined positions on the left and right-hand sides of and above the frame. Perforations 2a and 2b, 3a and 3b, and 4a and 4b are located at exactly the same positions in relation to their corresponding frames. Hereinafter, the perforations 2a, 3a and 4a located on the left-hand side of the frames on the film 1 are referred to as first perforations, while the perforations 2b, 3b and 4b located on the right-hand side are referred to as second perforations. Reference character P.S in FIG. 1 denotes a detection position where a photoelectric conversion device detects the perforations on the film.

In FIG. 1, the first perforation 3a of the frame 3 is located at the detection position P.S of the photoelectric conversion device. In this feed control device, when the first perforation 3a is at the detection position P.S, the frame 3 is opposite the aperture of the camera which is not shown. Hereinafter such a frame position is referred to as a reference position. In the feeding of the film 1, the frames are located accurately at the aperture by stopping the perforations located at exactly the same positions in relation to their corresponding frames at a predetermined position.

Hence, the film-feed control device duty drives a feed motor and thereby decelerates a film when it detects a perforation immediately before the perforation indicating an objective stopping position during film feeding. When the perforation indicating the objective stopping position is detected, the film feed control device short brakes the feed motor to stop the film at a predetermined stopping position.

FIG. 2 (a) shows the film feed motor driving output waveform when the film feeding is conducted, FIG. 2(b) shows the perforation detecting waveform of the photoelectric conversion device, and FIG. 2(c) shows the brake operating waveform.

When exposure of the frame 3 shown in FIG. 1 and located at the reference position is completed, one frame feeding is initiated at time t1 to locate a subsequent frame at the reference position. At time t2, the first perforation 3a of the frame 3 has passed the detection position P.S of the photoelectric conversion device, and the perforation detection waveform therefore falls. Thereafter, when the second perforation 3b of the frame 3 is detected by the photoelectric conversion device at time t3, duty drive of the film feed motor is initiated to decelerate the film. Thereafter, when the perforation indicating the objective stopping position, i.e., the first perforation 4a of the subsequent frame 4, is detected at time t4, duty drive of the film feed motor is stopped and braking operation is conducted to stop film feeding.

In a camera in which the film is fed at a high speed, however, deceleration of the film conducted between the two adjoining perforations is not enough, and the film may overrun beyond the objective stopping position.

Furthermore, even if braking is conducted when the perforation indicating the objective stopping position is detected, the film may not stop at once and may overrun due to the inertia of the film feeding mechanism including the motor. If the amount of overrun is fixed, each frame is stopped at substantially the same position in each frame feeding operation.

However, this amount of overrun varies, mainly in accordance with the film feeding speed when the film feeding speed reduces due to variation in battery voltage or ambient temperature, the amount of overrun required to stop the film reduces, and the film thus stops at a position immediately before the normal stopping position. Conversely, when the film feeding speed increases, the amount of overrun increases, and the film is fed beyond the normal stopping position.

SUMMARY OF THE INVENTION

An object of the present invention is to provide a film feeding cessation adjusting device for cameras which is capable of accurately stopping to a predetermined stopping position each frame of a film having a minimum number of perforations in order to ensure a sufficient data recording area.

According to the present invention, a deceleration signal generating device obtains a time which is earlier by a predetermined period than the time at which a first perforation detecting device detects the perforation which is the objective stopping position, on the basis of the results of the measurement of a timer device, and produces a deceleration signal at the obtained time. A control device decrease a film feeding speed of a film feeding device when it receives this deceleration signal, and stops film feeding conducted by the film feeding device when the first perforation detecting device detects the perforation which is the objective stopping position.

In the present invention, the control device decreases the film feeding speed of the film feeding device when the second perforation detecting device detects the perforation which is the objective stopping position, and stops film feeding of the film feeding device when the first perforation detecting device detects the perforation which is the objective stopping position.

In the present invention, the control device stops film feeding of the film feeding device when the perforation is detected by a perforation detecting device provided at a position which is shifted on an upstream side of a reference position with respect of a direction of feeding of the film by an amount of overrun when film feeding is stopped.

In the present invention, the control device stops film feeding of the film feeding device and starts counting of clock data by means of a counting device when the perforation detecting device detects the perforation. An output device converts the counted value of the counting device into a film feed, and outputs it.

In the present invention, the stopping signal generating device obtains a time which is delayed by a predetermined period from the time at which the perforation detecting device detects the perforation on the basis of the results of the measurement of the film feeding time by means of the timer device, and generates a feeding stopping signal at the obtained time. The control device stops film feeding of the film feeding device when it receives the feeding stopping signal.

In the present invention, a stopping signal generating device obtains a time which is delayed by a predetermined period from the time at which the perforation, detecting device detects the perforation on the basis of the results of the counting of the clock data when film feeding is stopped by means of a counting device, and generates a feeding stopping signal at the obtained time, The control device stops film feeding of the film feeding device when it receives that feeding stopping signal,

BRIEF DESCRIPTION OF THE DRAWINGS

FIG. 1 illustrates an example of a film used in a camera according to the present invention;

FIG. 2 is a time chart showing signal waveforms of individual components of a conventional film feeding control device when film feeding is conducted;

FIG. 7 shows the operation waveforms of individual components when the control program shown in FIGS. 5 and 6 is executed;

FIG. 8 illustrates the forward end portion of the film used in the camera according to the present invention;

FIG. 17 illustrates the relation between the allowance of the setting position of a photographing frame with respect to a predetermined photographing position which is opposite the aperture and the mounting position of the photoelectric conversion device;

FIG. 19 is a time chart showing the operation waveforms of individual components of the third embodiment when film feeding is conducted;

FIG. 20 illustrates how the film is fed in the third embodiment;

DETAILED DESCRIPTION OF THE PREFERRED EMBODIMENTS

Figure 3:
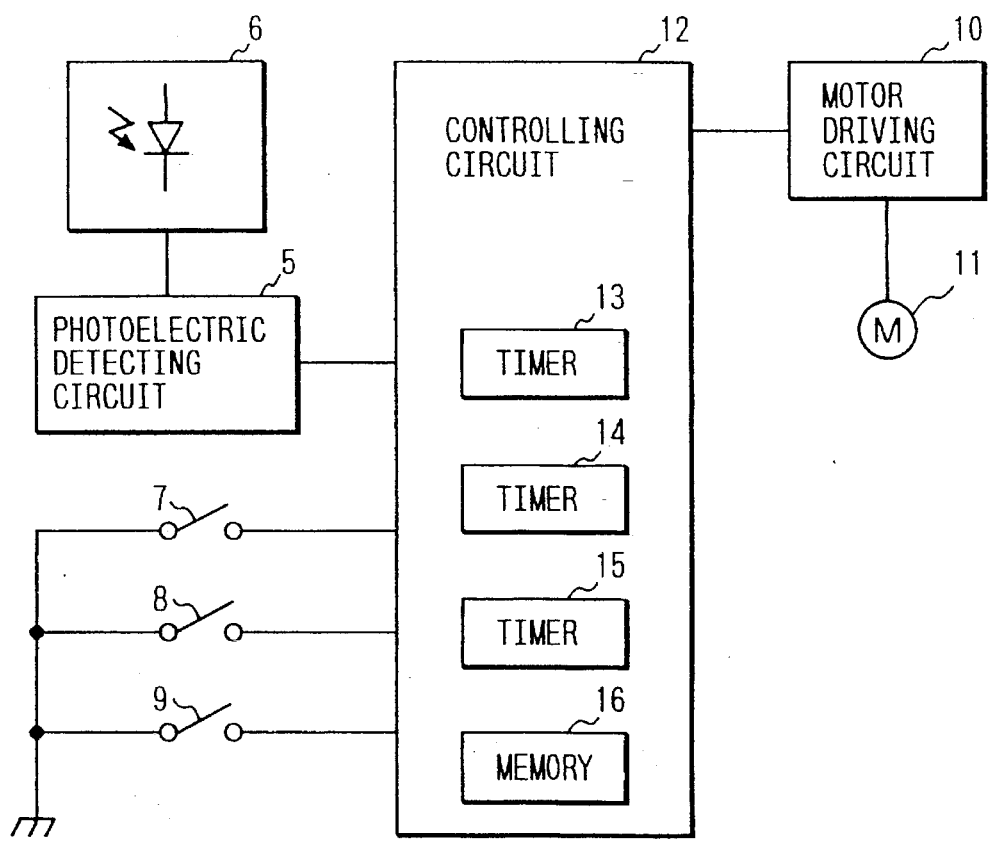
FIG. 3 is a diagrammatic view showing the structure of a first embodiment of the present invention.

FIG. 3 is a block diagram of a first embodiment of the present invention.

Figure 4:
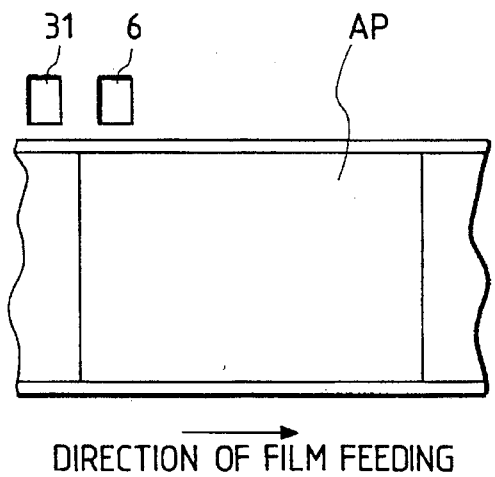
FIG. 4 illustrates how a photoelectric conversion device is disposed in relation to an aperture of the camera.

A photoelectric detecting circuit 5 detects perforations on a film by means of a photoelectric conversion device 6, such as a photo-reflector, The photoelectric conversion device 6 is provided on the left-hand side above an aperture AP of the camera, as shown in FIG. 4, A switch 7 is turned on when a shutter release button (not shown) is pressed lightly. A switch 8 is turned on when the shutter release button is fully depressed. A switch 9 is turned on when a rear cover of the camera is closed. A motor driving circuit 10 drives a film feed motor 11. A control circuit 12, including a microcomputer, timers 13 to 15 and a memory 16, executes a control program, which will be described later, to control the film feeding operation.

Figure 5:
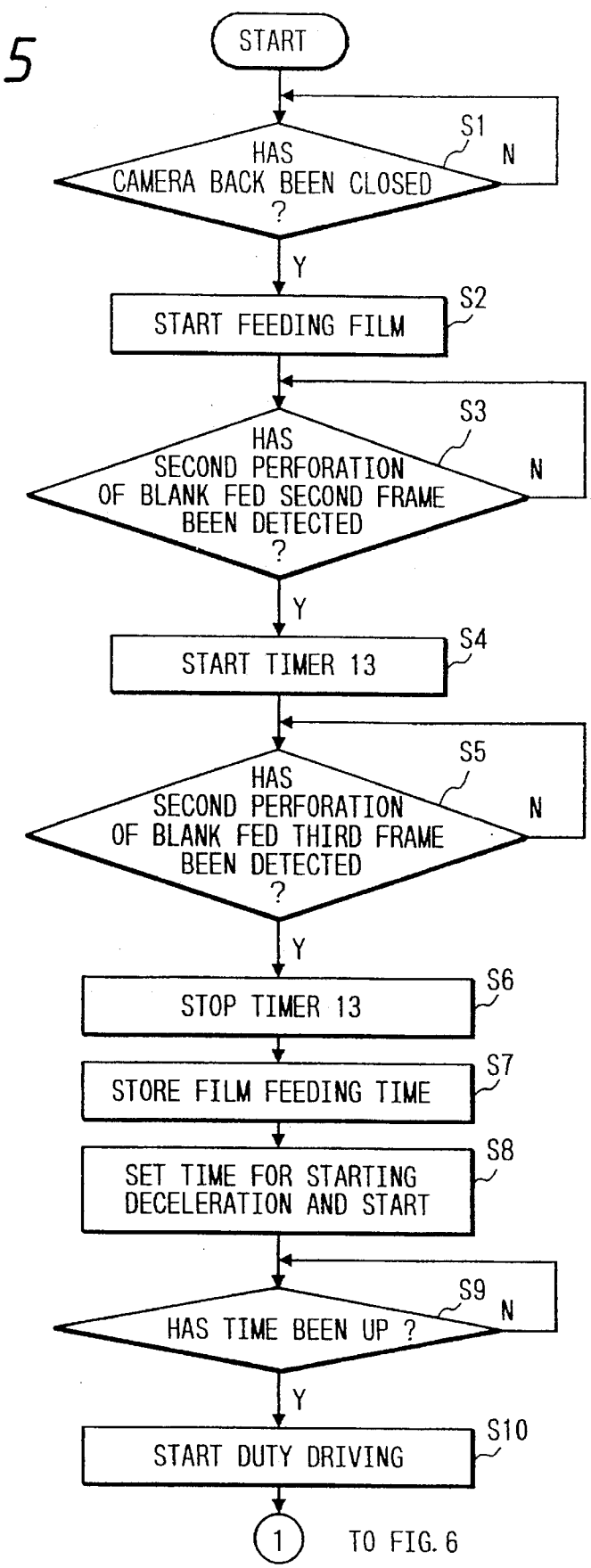
FIG. 5 is a flowchart showing an initial feeding control program.
Figure 6:
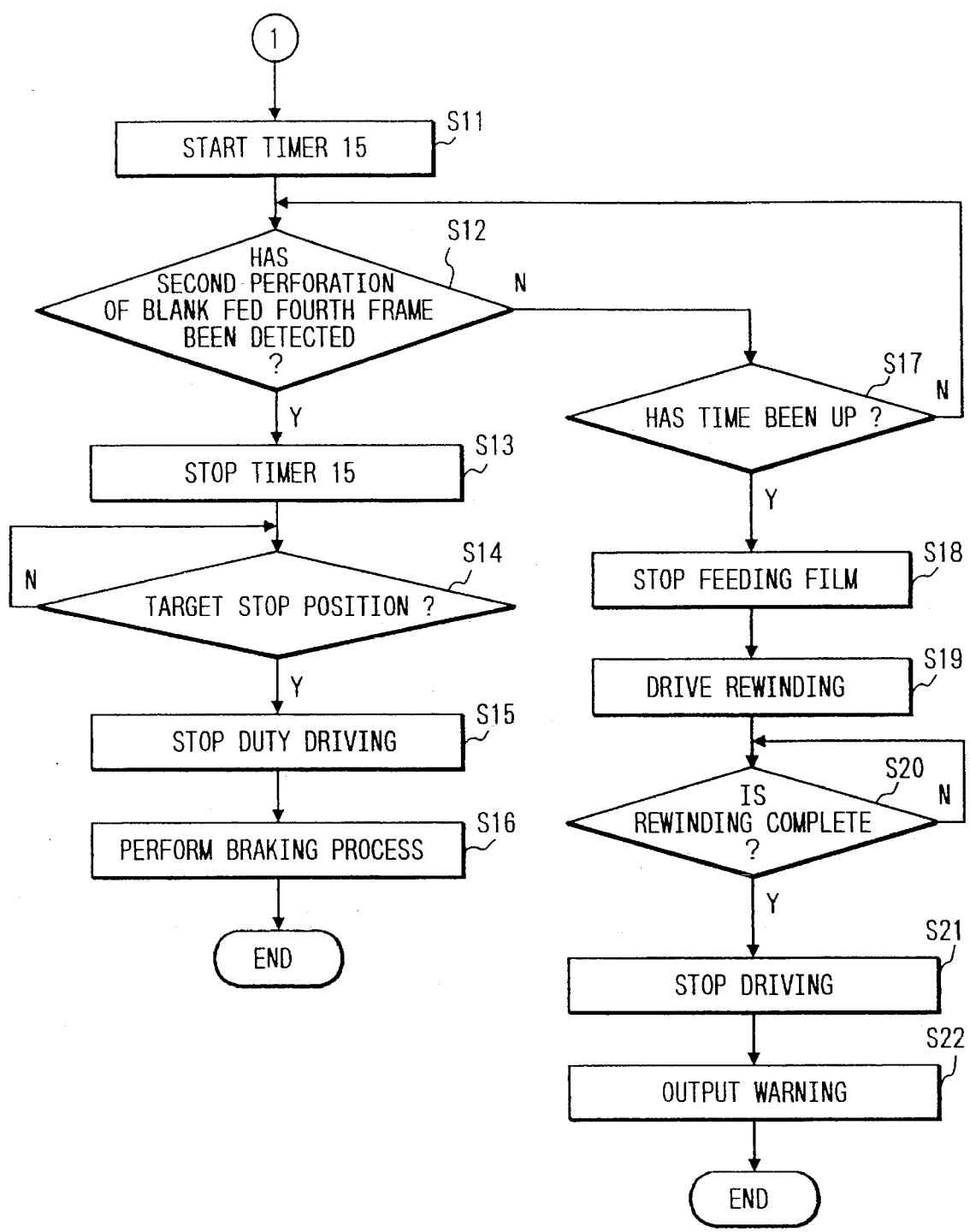
FIG. 6 is a flowchart showing the initial feeding control program.

FIGS. 5 and 6 are a flowchart of a control program executed to feed a first photographing image plane of a film mounted in a camera to a position where it opposes an aperture. FIG. 7(a) shows the motor driving output waveform when the control program of FIGS. 5 and 6 is executed, FIG. 7(b) shows the perforation detecting waveform, and FIG. 7(c) shows the brake operating waveform. FIG. 8 illustrates the forward end portion of the film used in the camera according to the present invention. The operation of feeding a new film 21 through four frames 22 to 25 and locating a first photographing image plane 26 to a position where it opposes the aperture AP will be described with reference to FIGS. 5 to 8. Hereinafter, perforations 22a to 26a located on the left-hand side of and above the frames 22 to 26 are referred to as first perforations, while perforations 22b to 26b formed on the right-hand side above the frames are referred to as second perforations. The first perforations indicate the objective film stopping positions. That is, when film feeding is stopped when the photoelectric conversion device 6 shown in FIG. 4 detects the first perforation for each photographing image plane, the photographing image plane corresponding to the detected first perforation is opposite the aperture AP. Conventionally, the second perforations are used for deceleration of the film, that is, when the photoelectric conversion device 6 detects the second perforation, the film is decelerated.

It is determined in step S1 whether or not the rear cover of the camera has been closed. If the rear cover has been closed, the film feed motor 11 is driven in step S2 to initiate feeding of the film 21. At that time, the photoelectric conversion device 6 provided at the left-hand side of and above the aperture AP, as shown in FIG. 4, starts detection with the second perforation 22b of the blank fed first frame 22 (at time t11 in FIG. 7). Thereafter, it is determined in step S3 whether or not the second perforation 23b of the blank fed second frame 23 has been detected. If the second perforation 23b has been detected, the timer 13 for counting the time required to feed the film through one frame is set (at time t12 in FIG. 7). Thereafter, it is determined in step S5 whether or not the second perforation 24b of the blank fed third frame 24 has been detected. If the second perforation 24b has been detected, the timer 13 is stopped (at time t13 in FIG. 7) in step S6. In step S7, the one frame feeding time Ts (t13-t12) counted by the timer 13 is stored in the memory 16.

In step S8, time Ts-Tp, which is the one frame feeding time Ts with a predetermined time Tp deducted therefrom, is set in the timer 14 and operation of the timer 14 is started. Thereafter, in step S9, it is determined whether or not the time set in the timer 14 is exceeded. If the time is exceeded, duty drive of the film feed motor is initiated to decelerate the film in step S10 (at time t14 in FIG. 7). In the conventional film feed control device, duty drive of the film feed motor 7 is initiated at the time at which the second perforation 25b of the blank fed fourth frame 25 is detected by the photoelectric detecting circuit 5, i.e., at time t15 in FIG. 7, to decelerate the film. In the film feeding cessation control device according to the present invention, deceleration is initiated at time t14 which is earlier than time t15 by time Tp.

Next, the feed confirmation timer 15 is started in step S11, and then it is determined in step S12 whether or not the second perforation 25b of the blank fed fourth frame 25 has been detected, i.e., whether or not film feeding is proceeding normally. If the second perforation 25b has been detected, the process goes to step S13. If not, the process proceeds to step S17. In step S13, the timer 15 is stopped (at time t15 in FIG. 7). The time set in the timer 15 is one which is slightly longer than an estimated time from time t13 to time t15 in FIG. 7. Next, it is determined in step S14 whether or not the first perforation 26a of the first photographing image plane 26 has been detected, i.e., whether or not the objective film stopping position has been reached. If the objective film stopping position has been detected, duty drive of the motor 11 is stopped (at time t16 in FIG. 7) in step S15. Thereafter, in step S16, the motor 11 is braked. At that time, since deceleration is, as stated above, initiated at a time earlier than that at which it is conventionally initiated, the film feeding speed has been decreased sufficiently by the time t16, and the film 21 can be stopped accurately at the objective stopping position.

If the second perforation 25b has not been detected in step S12, it is determined in step S17 whether or not the time set in the timer 15 has expired. "Time up" shows that an anomaly has occurred in the film feeding operation. Therefore, the process goes to step S18 and the film feeding operation is stopped. If the time has not expired, the process returns to step S12. In step S19, the film feeding motor 11 is reversed to rewind the film 21. Thereafter, it is determined in step S20 whether or not rewinding has been completed. After rewinding has been completed, the motor 11 is stopped in step S21, and then the film feeding anomaly alarm is issued in step S22.

Figure 9:
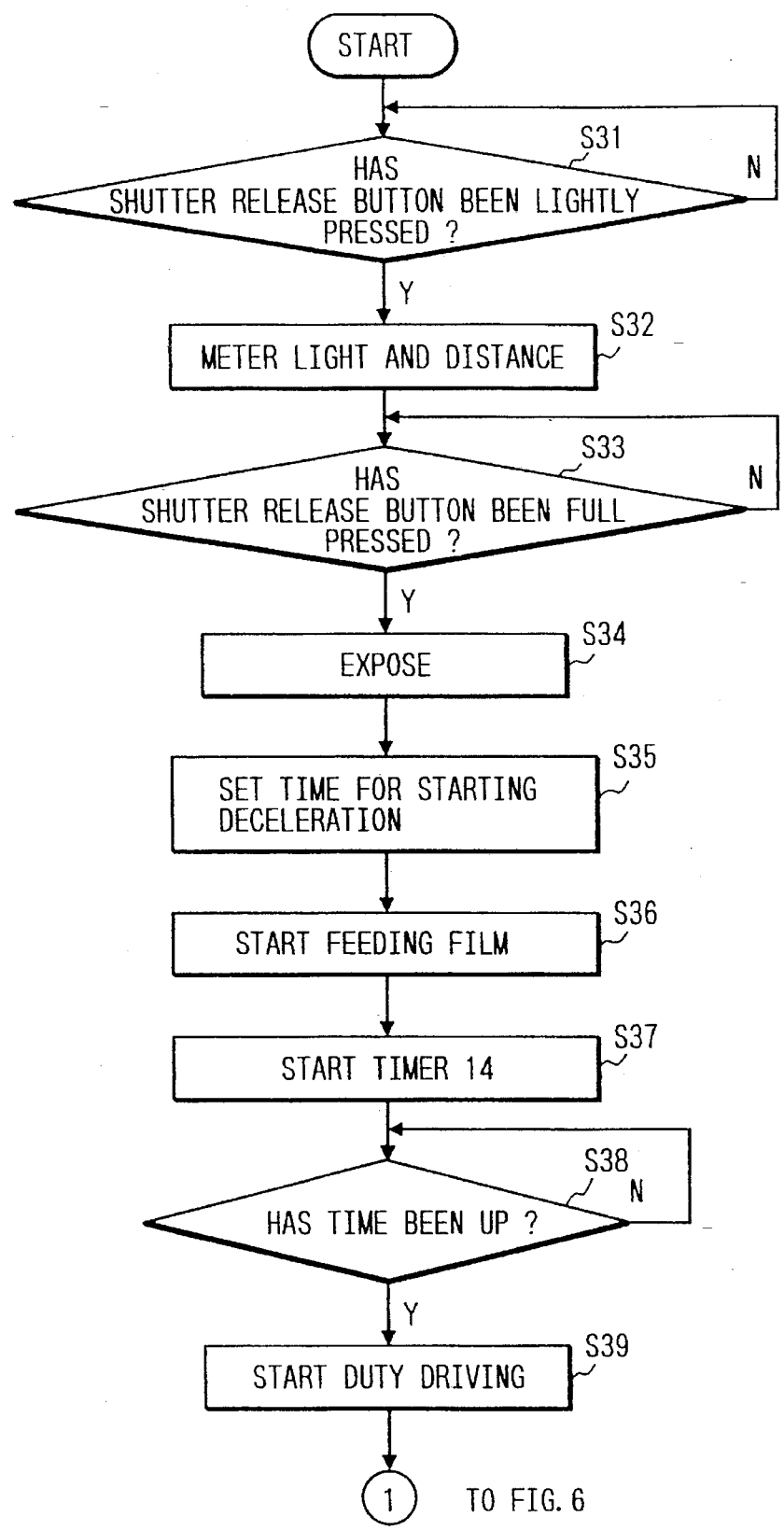
FIG. 9 is a flowchart showing the film feeding control program executed after a picture is taken.

FIG. 9 is a flowchart showing the film feeding control program executed for each photographic operation. The film feeding operation conducted after a picture has been taken on each photographing image plane on the film 21 will be explained with reference to FIG. 9.

It is determined in step S31 whether or not the shutter release button has been lightly pressed by means of the switch 7. If the shutter release button has been lightly pressed, light and distance are metered in step S32. Next, it is determined in step S33 whether or not the shutter release button has been fully pressed by means of the switch 8. If the shutter release button has been fully pressed, exposure is conducted in step S34. Thereafter, the aforementioned deceleration starting time Ts-Tp is set in the timer 14 in step S35. After film feeding is initiated in step S36, the timer 14 is started in step S37. In step S38, it is determined whether or not the time set in the timer 14 has expired, i.e., whether or not the deceleration starting time has been reached. If the deceleration starting time has been reached, duty drive of the motor 11 is initiated in step S39 to decrease the film feeding speed. The subsequent operation is the same as that shown in FIG. 6, description thereof being omitted.

As can be seen from the foregoing description, in this embodiment, the time Ts required to feed the film through one frame after the film has been loaded is counted, and the time shorter than this time Ts by the predetermined time Tp is set in the timer 14. When the time set in the timer 14 has expired, deceleration of the feed motor 11 is initiated. Thus, deceleration is conducted earlier than that in the conventional device, and the film feeding speed has thus been sufficiently decreased by the time the perforation indicating the objective film stopping position is detected. Consequently, even when the high-speed film feeding is conducted, the film can be stopped at a predetermined position with a high degree of accuracy.

In the first embodiment, the time required to feed the film through one frame in the initial film feeding operation conducted immediately after the film has been loaded in the camera is measured. However, an average feeding time may be obtained by measuring a time required to feed the film through the plurality of frames. In a prewinding type camera, the feeding time may be measured when the film is rewound through one frame after it has been preliminarily fed to the final frame.

Furthermore, in the first embodiment, the time Ts required to feed the film through one frame, measured at the initial film feeding operation, is stored in the memory 16 so that it can be utilized in the subsequent film feeding process. However, the feeding time may be measured and stored in the memory 16 in each film feeding operation.

The film feeding time is readily affected by changes in the voltage of a battery or in the ambient temperature. Also, it varies in accordance with the winding diameter of a spool around which the film is wound. Hence, where the one frame feeding time Ts measured in the initial film feeding operation is used as a reference, it may be corrected in each film feeding operation in accordance with changes in the voltage of the power source or ambient temperature and frame No. Furthermore, the time Tp used for initiation of deceleration may be corrected in accordance with the feeding time Ts. For example, if the feeding time Ts is short, i.e., if the feeding speed is high, since it is estimated that the amount of overrun when the film is stopped is large, the time Tp may be increased so that deceleration can be started earlier.

Figure 10:
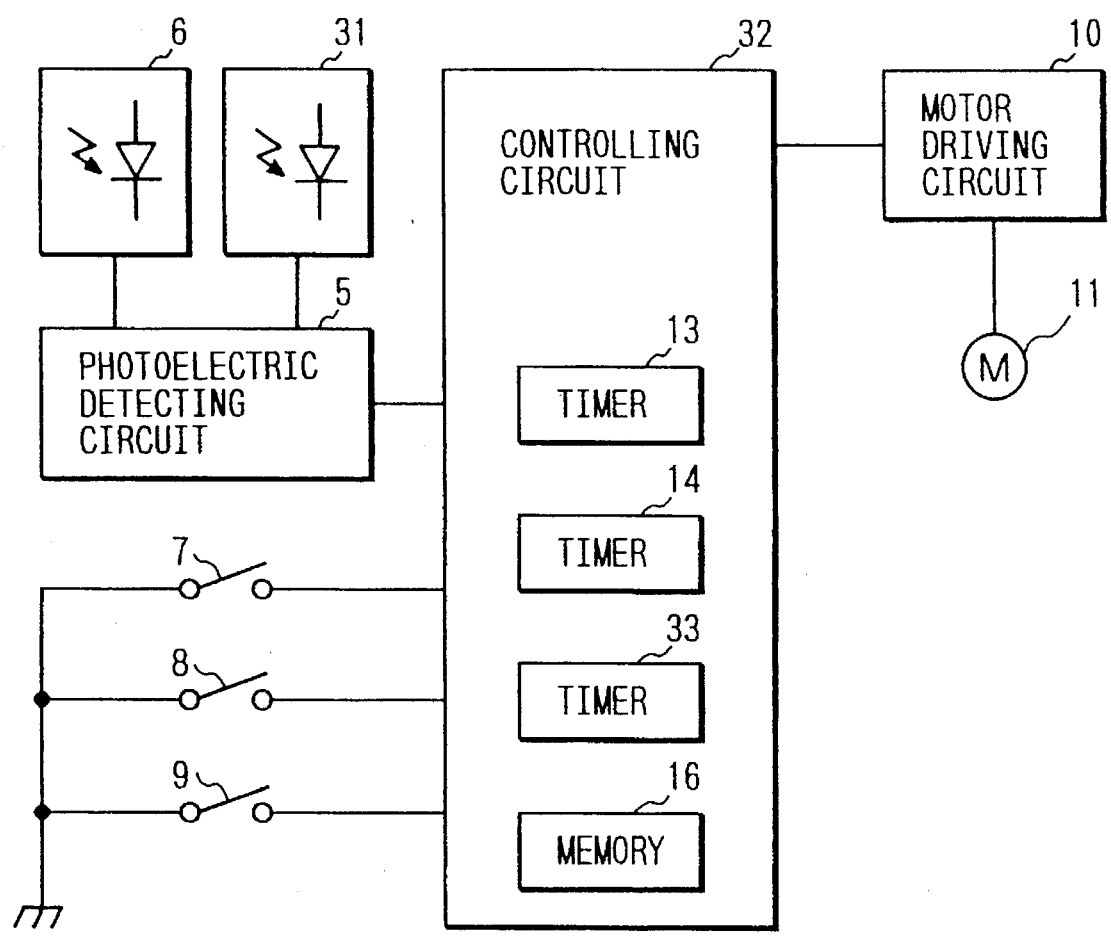
FIG. 10 is a diagrammatic view showing the structure of a second embodiment of the present invention.

FIG. 10 is a block diagram of a second embodiment of the present invention. In FIG. 10, identical or similar components to those shown in FIGS. 3 and 4 are designated with the same reference characters. Hence, the second embodiment will be described with an emphasis on a difference between the first and second embodiments.

In FIG. 10, a photoelectric conversion device 31 is provided on the left-hand side, i.e., upstream, of the photoelectric conversion device 6 shown in FIG. 4 with respect to the direction in which the film is fed so as to detect the perforations on the film 21 before the photoelectric conversion device 6 does.

Figure 11:
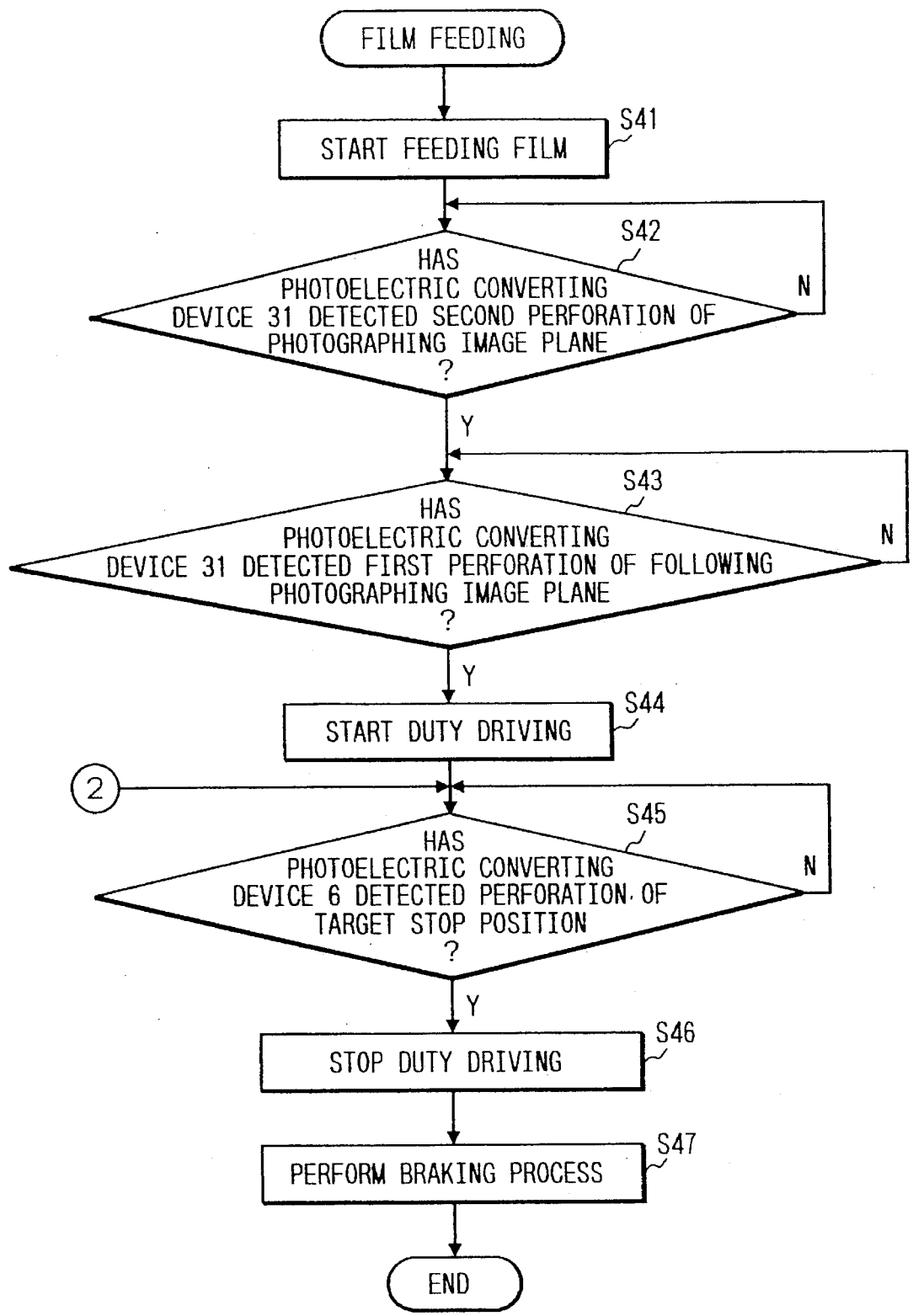
FIG. 11 is a flowchart showing a feeding control program executed in the second embodiment.
Figure 12:
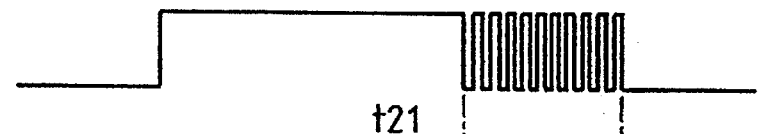
FIG. 12 shows the operation waveforms of individual components when the control program shown in FIG. 11 is executed.
Figure 12:
Figure 12:
Figure 13:
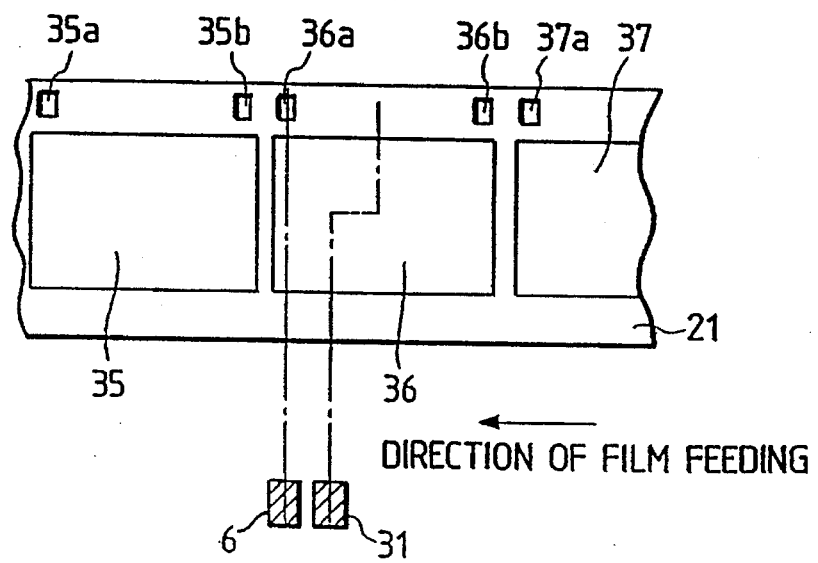
FIG. 13 illustrates the positional relation between the photoelectric conversion device and perforations on the film.

FIG. 11 is a flowchart showing the film feeding control program executed by a control circuit 32. FIG. 12(a) shows the motor driving waveform, FIG. 12(b) shows the perforation detecting waveform, and FIG. 12 (c) shows the brake operating waveform. FIG. 13 illustrates the positional relation between the perforations on the film and the photoelectric conversion devices 6 and 31. The operation of the second embodiment will be described below with reference to FIGS. 11 to 13.

Assuming that a picture-taking operation has been completed on a photographing image plane 36 shown in FIG. 13 located at a position where it faces the aperture AP, film feeding is initiated in step S41, and then it is determined in step S42 whether or not the photoelectric conversion device 31 has detected a second perforation 36b of the photographing image plane 36. If the second perforation 36b has been detected, the process goes to step S43 (at time t21 in FIG. 12). In step S43, it is determined whether or not the photoelectric conversion device 31 has detected a first perforation 37a of a subsequent photographing image plane 37. If the first perforation 37a has been detected, duty drive of the motor 11 is initiated in step S44 (at time t22 in FIG. 12).

Next, it is determined in step S45 whether or not the photoelectric conversion device 6 has detected the perforation indicating the objective film stopping position. If the first perforation 37a has been detected, the process goes to step S46 (at time t24 in FIG. 12), and duty drive of the motor is stopped. Thereafter, in step S47, braking is conducted. A perforation detecting waveform generated at time t23 in FIG. 12 is a waveform when the photoelectric conversion device 6 has detected the second perforation 36b of the photographing image plane 36. Arrangement of the two photoelectric conversion devices 6 and 31 at the same spacing as that between the second perforation of the present photographing image plane and the first perforation of a subsequent photographing image plane allows the detection waveform of the photoelectric conversion device 31 at time t22 and the detection waveform of the photoelectric conversion device 6 to be superimposed.

As can be seen from the foregoing description, the photoelectric conversion device 31 is provided at a position where it detects a perforation prior to the photoelectric conversion device 6, and when this photoelectric conversion device 31 has detected the first perforation of a subsequent photographing image plane, deceleration of the film is initiated. Therefore, deceleration is initiated earlier than in the conventional device, and the film feeding speed has thus been sufficiently decreased by the time the photoelectric conversion device 6 located at the same position as in the conventional device detects the perforation indicating the objective film stopping position. Consequently, even when high-speed film feeding is performed, high film stopping accuracy can be obtained.

In the second embodiment, when the photoelectric conversion device 31 has detected the first perforation of a subsequent photographing image plane, deceleration is initiated. However, deceleration may be initiated on the basis of the amount through which the film is fed, detected by a pulse generator for detecting the amount at which the film is fed.

Figure 14:
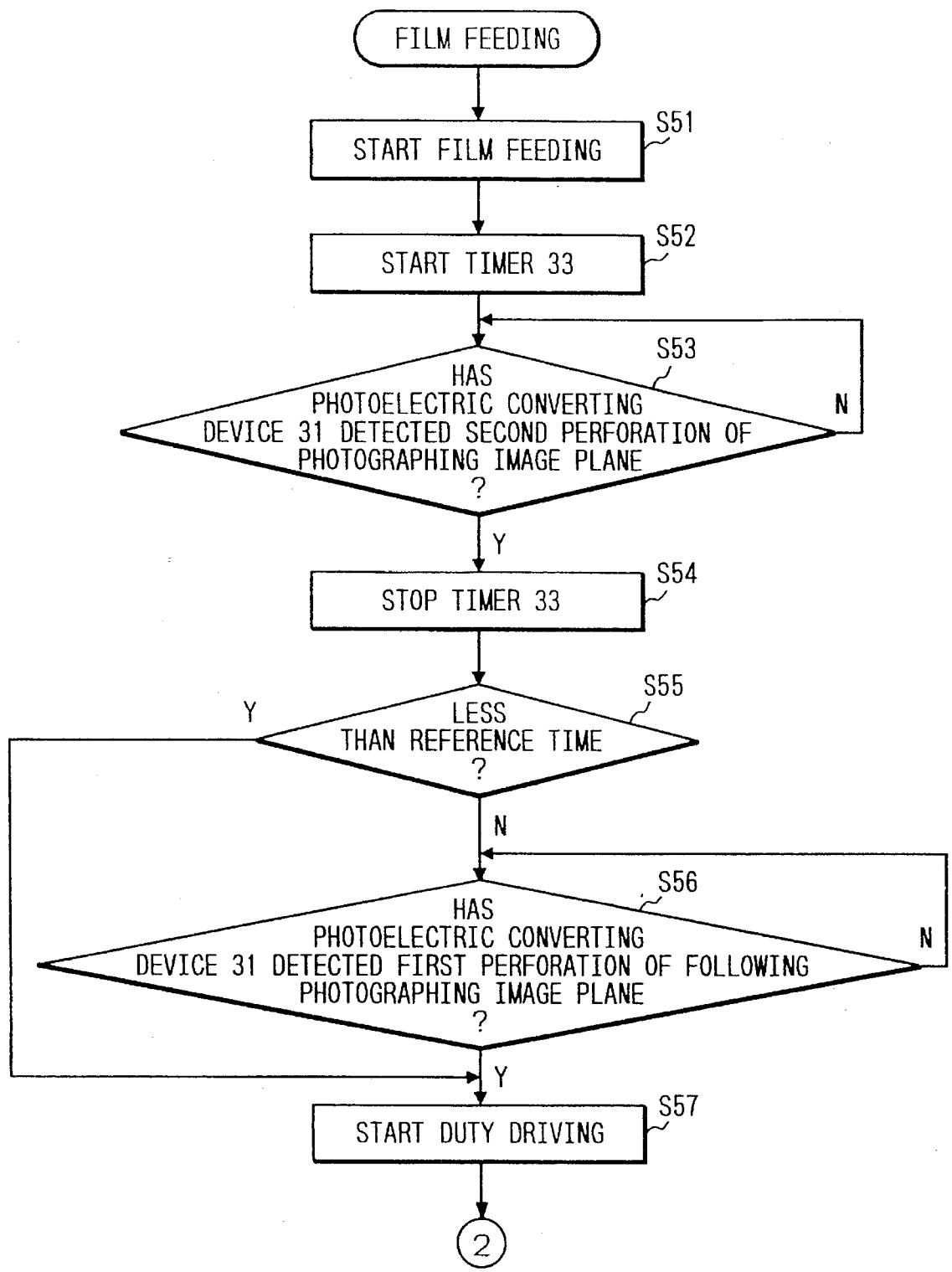
FIG. 14 is a flowchart showing a modification of the feeding control program executed in the second embodiment.

FIG. 14 is a flowchart showing a modification of the film feeding control program. The film feeding operation in which the time at which deceleration of the film feeding speed is initiated is changed in accordance with the time required to feed the film to a perforation detected first after film feeding has been initiated will be explained with reference to FIG. 14. As in the case shown in FIG. 11, it is assumed that metering of light and distance and exposure have been completed on the photographing image plane 36 shown in FIG. 13.

Film feeding is initiated in step S51, and then a timer 33 is started in step S52 to measure the time required to feed the film. In step S53, it is determined whether or not the photoelectric conversion device 31 has detected the second perforation 36b of the photographing image plane 36. If the second perforation 36b has been detected, the timer 31 is stopped in step S54 (at time t21 in FIG. 12).

It is determined in step S55 whether or not the time measured by the timer 33, i.e., the time between the initiation of the film feeding and the detection of the perforation 36b by the photoelectric conversion device 31, is the same as or longer than the reference time set on the basis of the film feeding speed beforehand. If the time measured by the timer is less than the reference time, the process goes to step S57, and duty drive is initiated, because the film feeding speed is higher than the reference feeding speed. If the time measured by the timer is the same as or longer than the reference time, the process goes to step S56, and it is determined whether or not the photoelectric conversion device 31 has detected the first perforation 37a of the subsequent photographing image plane 37. If the first perforation 37a has been detected, duty drive is initiated in step S57. Thereafter, the process goes to step S46 in FIG. 11, and it is determined whether or not the photoelectric conversion device 6 has detected the perforation 37a indicating the objective film stopping position, as stated above. If the perforation 37a has been detected, duty drive is stopped, and then braking is performed.

As can be seen from the foregoing description, the time actually required to feed the film is measured in each film feeding and the measured time is compared with the reference feeding time. If the measured time is shorter than the reference feeding time, the film feeding speed is decreased immediately after the photoelectric conversion device 31 has detected the perforation first. Hence, even when the film feeding speed is increased due to a change in the voltage of a battery or the ambient temperature or depending on frame No., since deceleration of the film is initiated earlier, the film feeding speed can be sufficiently decreased by the time the photoelectric conversion device 6 detects the perforation indicating the objective film stopping position, and the film can accurately be stopped at a predetermined position.

In the first and second embodiments, a film having two perforations for each photographing image plane has been used. However, the number of perforations may be one or at least three for each photographing image plane.

In the configuration of the first and second embodiments, the photoelectric detecting circuit 5 and the photoelectric conversion device 6 constitute a first perforation detecting device, the photoelectric detecting circuit 5 and the photoelectric conversion device 31 form a second perforation detecting device, the motor driving circuit 10 and the film feed motor 11 form a film feeding device, the control circuits 12 and 31 form a control device, the timer 13 constitutes a counting device, and the timer 14 constitutes a deceleration signal generating device.

As will be understood from the aforementioned description, according to the first embodiment of the present invention, a time which is earlier by a predetermined period than the detection of the perforation by the first perforation detecting device is obtained on the basis of the results of the measurement of the film feeding time, and deceleration of the film is initiated at the obtained time. Therefore, even in a camera in which the film is fed at a high speed, the film feeding speed has been sufficiently decreased by the time the first perforation detecting device detects the perforation and braking is conducted, and the film having a less number of perforations in order to provide the data storage area can be accurately stopped at a predetermined stopping position.

According to the second embodiment of the present invention, when the second perforation detecting device provided upstream of the first perforation detecting device with respect to the direction of feeding of the film has detected the perforation, deceleration of the film is initiated. Therefore, even in a camera in which the film is fed at a high speed, the film feeding speed has been sufficiently decreased by the time the first perforation detecting device detects the perforation and braking is conducted, and the film having a less number of perforations in order to provide the data storage area can be accurately stopped at a predetermined stopping position, as in the case of the first embodiment.

Figure 15:
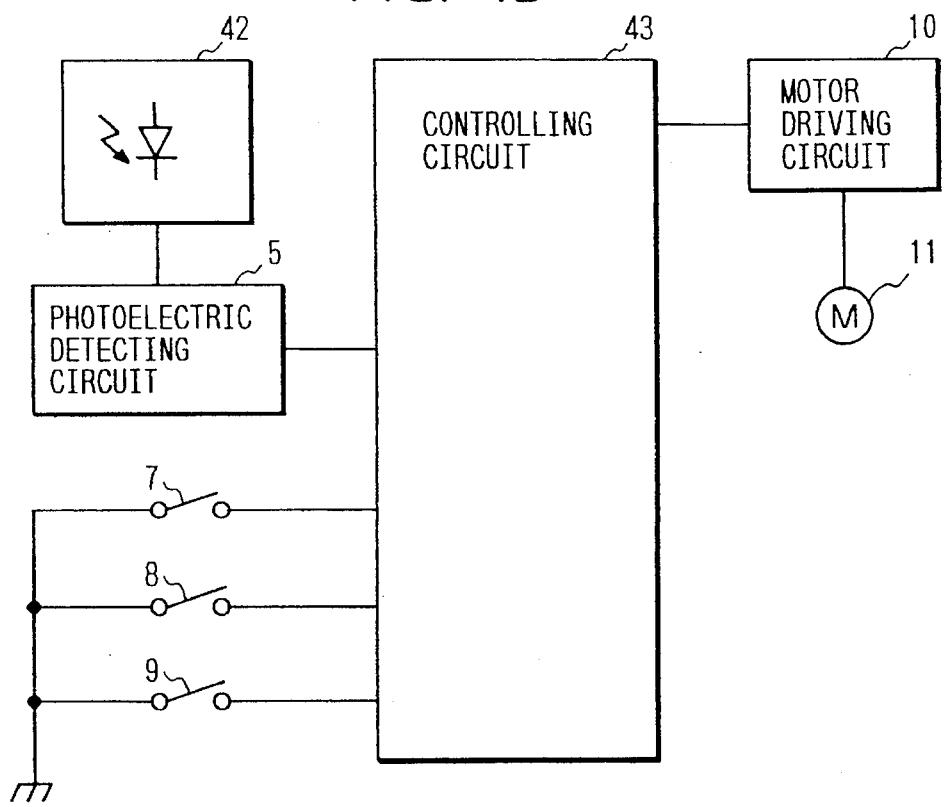
FIG. 15 is a diagrammatic view showing the structure of a third embodiment of the present invention.

FIG. 15 is a block diagram of a third embodiment of the present invention. In FIG. 15, identical components are designated with the same reference characters, description thereof being omitted.

Figure 16:
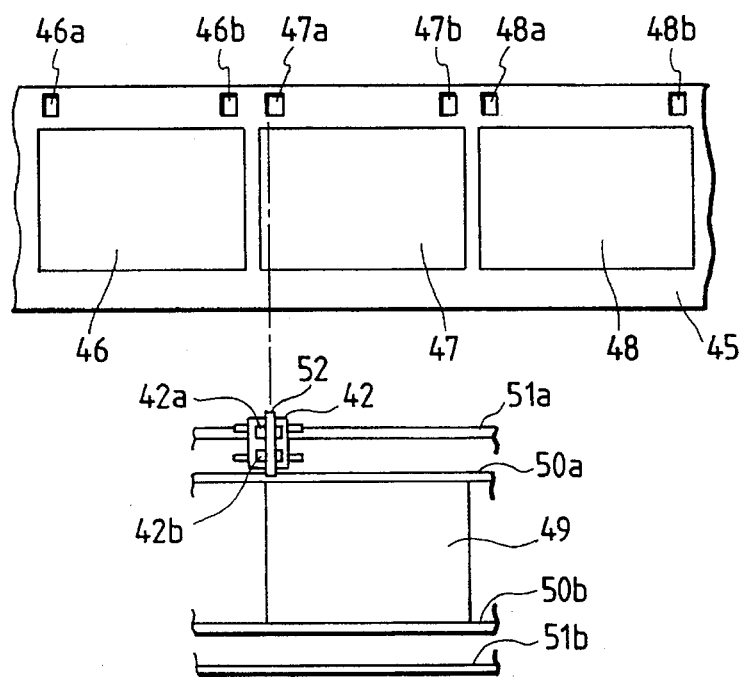
FIG. 16 illustrates the positional relation between the photoelectric conversion device and perforations on the film.

FIG. 16 shows a positional relation between a photoelectric conversion device 42 and perforations on a film. In FIG. 16, reference numeral 45 denotes part of a film used in a camera according to the present invention. Frames 46 to 48 on the film each have two perforations. Perforations 46a and 46b correspond to the frame 46, perforations 47a and 47b correspond to the frame 47, and perforations 48a and 48b correspond to the frame 48.

Reference numeral 49 denotes an aperture of the camera; 50a and 50b, inner rails; and 51a and 51b, outer rails. A photoelectric conversion device 42 for detecting perforations is provided above and on the left-hand side of the aperture 49. The photoelectric conversion device 42, including a light-receiving device 42a and a light-emitting device 42b, has a slit 52 to narrow the emitted rays of light and thereby improve detection accuracy. Hereinafter, the perforations 47a to 48a at the left-hand side and above the frames are referred to as the first perforations, and the perforations 46b to 48b at the right-hand side and above the frames are referred to as the second perforations.

In FIG. 16, the frame 47 is opposite the aperture 49, and the left edge of the first perforation 47a is in alignment to the center of the photoelectric conversion device 42. Hereinafter such a frame position is referred to as a reference position.

FIG. 17 shows the tolerance of the set position of the frame with respect to a predetermined photographic position which is opposite the aperture 49, as well as the relation between the set position of the frame and the mounted position of the photoelectric conversion device 42.

FIG. 17(a) illustrates the frame 47 which is present at the reference position, i.e., whose left edge of the first perforation 47a is in alignment with the center of the photoelectric conversion device 42. FIG. 17(b) illustrates the frame 47 which has overrun the center during feeding and whose left edge of the first perforation 47a is in alignment with the allowable upper limit Max of the set position indicated in FIG. 17(d). Overrunning of the frame 47 beyond the position indicated by the allowable upper limit Max may allow the portion between the frame 47 and a subsequent frame to be printed. FIG. 17(c) illustrates the frame 47 which has been stopped at a position where the left edge of the first perforation 47a thereof is in alignment with the allowable lower limit Min of the set position indicated in FIG. 17 (d). Stoppage of the frame 47 on this side of the allowable lower limit Min may allow the portion of the film between the preceding frame and the frame 47 to be printed.

Thus, the film 45 must be stopped during feeding at a position where the left edge of the first perforation located at exactly the same position with respect to the frame 47 is located within the permissible range defined by the upper limit Max and the lower limit Min with the reference position N as the center, shown in FIG. 17(d).

FIG. 17 (e) illustrates the photoelectric conversion device 42 disposed at a position where the center thereof is in alignment with the reference position N. So long as feeding of the film is stopped when the photoelectric conversion device 42 has detected the first perforation 47a of the frame 47, the left edge of the perforation 47a never stops on this side of the reference position N but stops at a position which is shifted toward the upper limit Max from the reference position N. Hence, feeding of the film 45 must be controlled such that the left edge of the first perforation 47a stops between the reference position N and the upper limit Max. In contrast, FIG. 17 (f) illustrates the photoelectric conversion device 42 disposed at a position where the center thereof is in alignment with the lower limit Min. In this case, the left edge of the first perforation 47a, which may be stopped at the lower limit Min of the permissible range, can be stopped between the lower limit Min and the upper limit Max. Therefore, in the camera according to the present invention, the photoelectric conversion device 42 is mounted such that the center thereof is in alignment with the lower limit Min.

Figure 18:
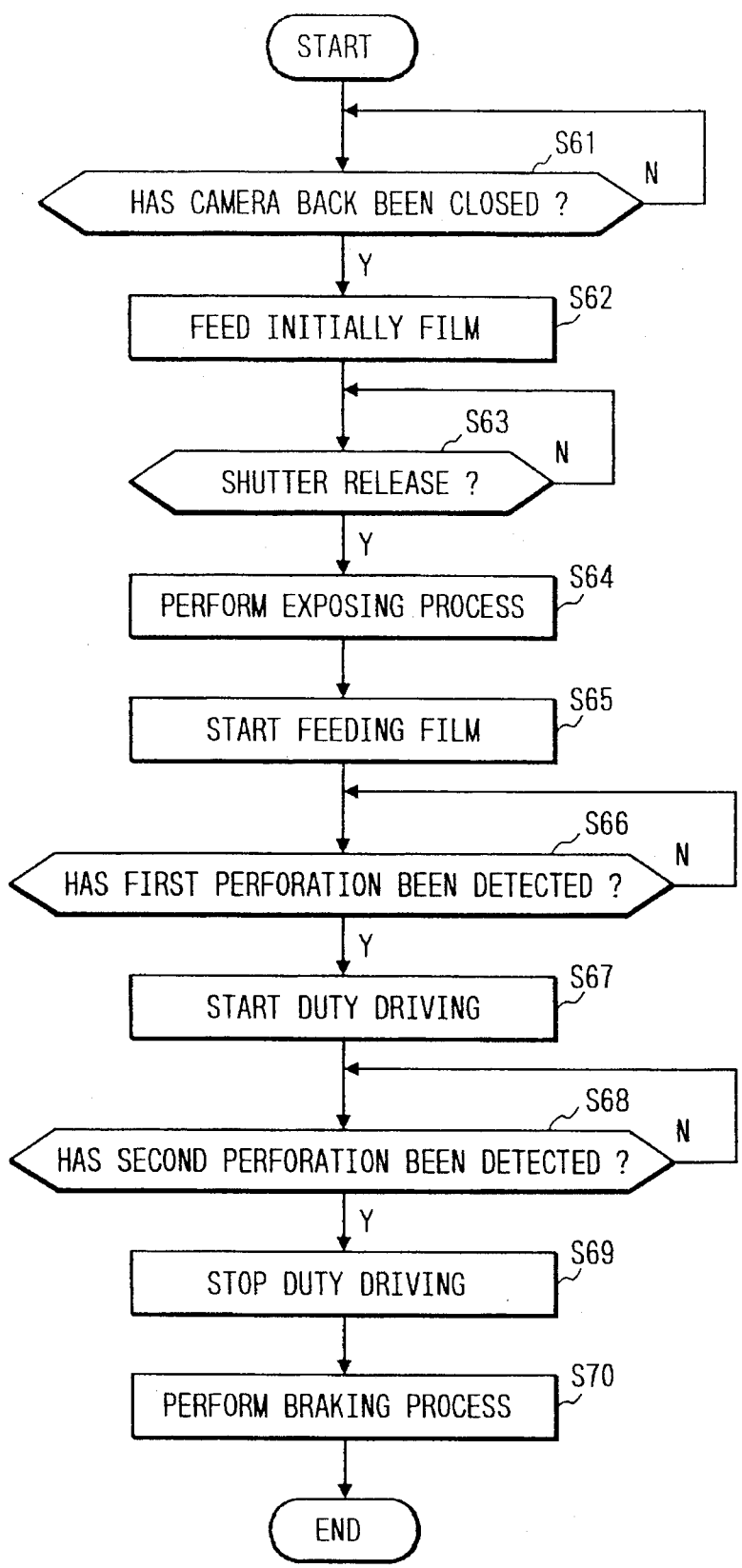
FIG. 18 is a flowchart showing the feeding control program executed in a third embodiment of the present invention.

FIG. 18 is a flowchart showing the feed control program executed by a control circuit 43. FIG. 19(a) shows the driving output waveform for the motor 11 when the film is fed, FIG. 19(b) shows the perforation detecting waveform of the photoelectric conversion device 42, and FIG. 19(c)

shows the brake operating waveform. FIG. 20 illustrates how far the film is moved by each of the times indicated in FIG. 19. In FIG. 20, the broken line shows the central position of the photoelectric conversion device 42. The operation of the third embodiment will now be described with reference to FIGS. 18 to 20.

In step S61, it is determined whether or not the rear cover has been closed by means of the switch 9. If the rear cover has been closed, the film is initially fed through a predetermined number of frames in step S62. Thereafter, it is determined in step S63 whether or not the shutter release button has been operated by means of the switches 7 and 8. If it has been operated, metering of the light and distance, then exposure of the first photographing frame 55 shown in FIG. 20 are performed in step S64.

After a picture has been taken, the motor 11 is driven to initiate feeding of the film (at time t31 in FIGS. 19 and 20) in step S65. Next, it is determined in step S66 whether or not the photoelectric conversion device 42 has detected the perforation to be detected first, i.e., the second perforation 55b of the first photographing frame 55. If the second perforation 55b has been detected, the motor 11 is duty driven to decrease the film feeding speed in step S67 (at time t32 in FIGS. 19 and 20). In step S68, it is determined whether or not the perforation to be detected secondly, i.e., the first perforation 56a of the second photographing frame 56, has been detected. If the first perforation 56a has been detected, duty drive of the motor stopped is in step S69, and then braking is performed in step S70 (at time t33 in FIGS. 19 and 20).

Although braking is performed at time t33 in FIG. 19, the film overruns due to the inertia, and the left edge of the first perforation 56a of the photographing frame 56 shown in FIG. 20 will be located beyond the center of the photoelectric conversion device 42 at time t34. However, since the photoelectric conversion device 42 is disposed, as stated above, such that the center is on the allowable lower limit Min indicated in FIG. 17(d), the left edge of the perforation 56a of the photographing frame 56 is within the allowable range with respect to the reference position N, that is, the photographing frame 56 is set within the allowable range with respect to the reference position N.

Thus, the photoelectric conversion device 42 is provided at a position where the center thereof shifts from the reference position N toward the upstream side with respect to the direction of feeding of the film by the amount of overrun when feeding of the film is stopped. It is therefore possible to stop the photographing frame accurately at a predetermined photographing position.

Furthermore, it is also possible to stop the photographing frame within the allowable range even when the amount of overrun varies due to a change in the battery voltage or ambient temperature.

Figure 21:
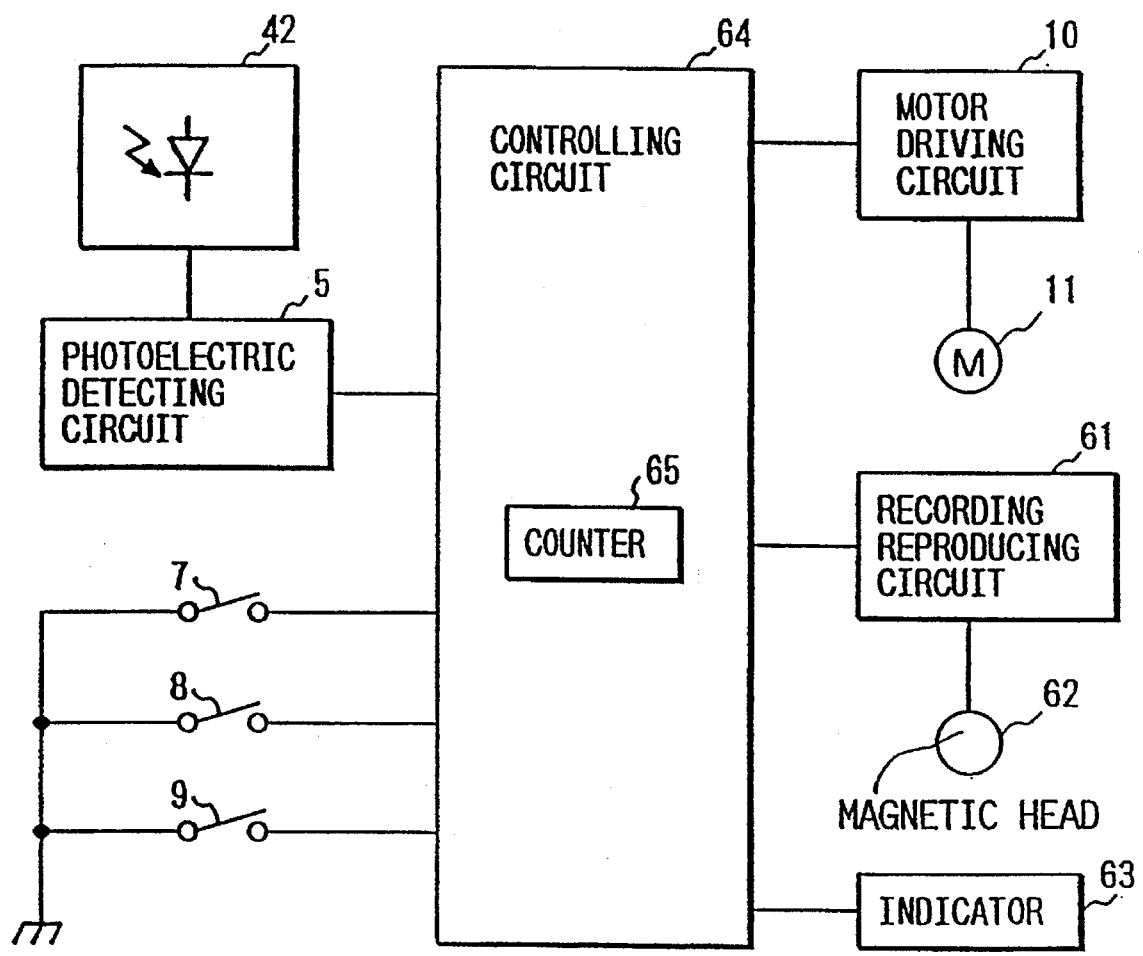
FIG. 21 is a diagrammatic view showing the structure of a fourth embodiment of the present invention.

FIG. 21 is a block diagram of a fourth embodiment of the present invention. In FIG. 21, identical components to those shown in FIG. 15 are designated with identical reference numerals.

A recording/reproducing circuit 61 records data on a magnetic recording medium coated on the film by means of a magnetic head 62 or reproduces data recorded on the magnetic recording medium. A display 63 reproduces magnetic clock data recorded on the film at fixed intervals at a recording density of, for example, 10 bits/mm and displays the counted value. It is not necessary for the display 63 to be incorporated in the camera body. The magnetic clock data may be output from the camera to an external display device which displays it. A control circuit 64, incorporating a counter 65, controls feeding of the film, as well as recording/reproduction and display of data.

Figure 22:
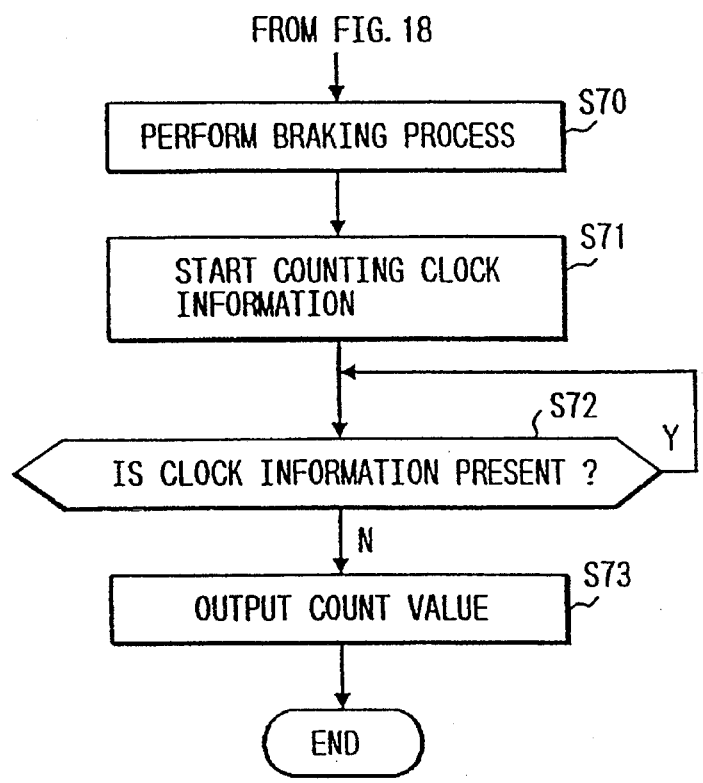
FIG. 22 is a flowchart showing the feeding control program executed in the fourth embodiment.

FIG. 22 is a flowchart showing the film feeding and recording/reproduction control program executed by the control circuit 64. In this program, the processing up to step S70 is the same as that from step S61 to step S70 shown in FIG. 18, so the processing from step S70 and on will be explained. Also, this control program is executed in the adjusting process after manufacture of the camera according to the present invention to check whether the center of the photoelectric conversion device 42 is located precisely at the allowable lower limit Min with respect to the reference position N. Thus, the exposure process in step S64 shown in FIG. 18 may be an actual exposure operation but conducted on a testing basis using a test switch or the like. At that time, a film is used on which magnetic clock data is recorded on the magnetic recording medium coated thereon and which is exclusively used for adjustment.

FIG. 23(a) shows the motor driving output waveform when the film is fed, FIG. 23(b) shows the perforation detecting waveform, FIG. 23(c) shows the brake operating waveform, and FIG. 23(d) shows the magnetic clock data reproducing waveform.

Figure 23:
FIG. 23 is a time chart showing the operation waveforms of individual components of the fourth embodiment when film is fed.
Figure 23:
Figure 23:
Figure 23:
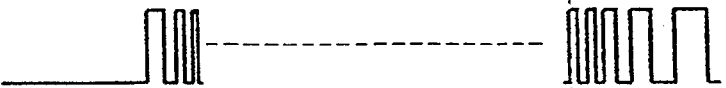

After braking of the motor 11 has been performed in step S70, reproduction of the magnetic clock data on the film through the recording/reproduction circuit 61 and counting of the reproduced magnetic clock data by the counter 64 are initiated in step S71 (at time t35 in FIG. 23). In other words, the amount of overrun immediately after the perforation to be detected secondly has been detected is detected. Thereafter, in step S72, it is determined whether or not the magnetic clock data is present. If there is no clock data, it can be thought that the film has completely stopped, and the counted value is output in the form of a distance through which the film has overrun in step S73.

Figure 24:
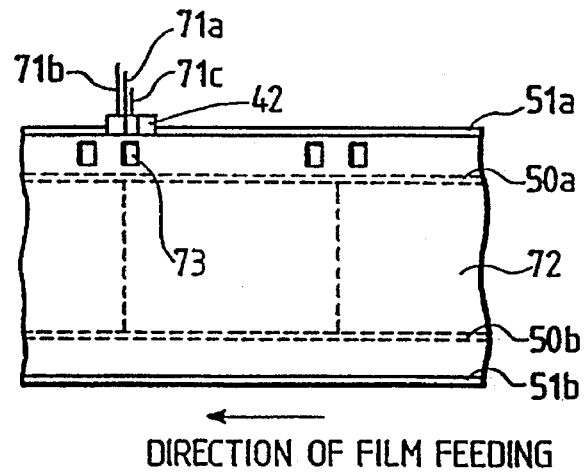
FIG. 24 illustrates the results of the film feeding in the fourth embodiment.

FIG. 24 shows the film which is opposite the aperture after the aforementioned control program has been executed. Above the upper rail 51a of the camera are provided markings 71a, 71b and 71c for respectively indicating the position of the reference position N, the allowable upper limit Max and the allowable lower limit Min. The photoelectric conversion device 42 has been mounted during manufacture at a position where the center thereof is aligned with the marking 71c. After feeding of the film has been stopped, the position of the left edge of the first perforation 73 is collated with the markings 71a and 71c. If the position of the left edge is between the markings 71b and 71c, it can be said that the photographing frame has been set within the range defined by the upper limit Max and the lower limit Min. If the allowable range is from +1 mm to −1 mm, visual checking is possible.

If the left edge of the first perforation 73 does not reach the marking 71a in spite of the fact that the counter 65 has counted the amount of overrun of +1 mm, it can be seen that the photoelectric conversion device 42 has been mounted during manufacture at a position where the center thereof is shifted to this side of the lower limit Min. With such a photoelectric conversion device mounted in that state, if the film feeding speed is reduced to a degree in which no overrun occurs, the photographing frame may not be set within the allowable range of the reference position N.

Thus, in this embodiment, when the perforation to be detected secondly has been detected, feeding of the film is stopped by performing a braking process. Concurrently with this, the magnetic clock data on the film is reproduced and counted to measure the amount of overrun. Consequently, whether the photoelectric conversion device 42 has been mounted at a predetermined position can be readily checked, and the setting accuracy of the photographing frame can be improved using the photoelectric conversion device 42 mounted accurately at a predetermined position.

In the third and fourth embodiments, the photoelectric conversion device 42 and the photoelectric detecting circuit 5 in combination form the perforation detecting device, the motor driving circuit 10 and the film feed motor 11 in combination form the film feeding device, the control circuits 43 and 64 form the control device, the recording/reproducing circuit 61 and the magnetic head 62 in combination form the reproduction device, the counter 65 forms the counting device, and the display 63 forms the display device.

As will be understood from the foregoing description, in the third embodiment of the present invention, since the perforation detecting device is provided at a position which deviates from the reference position on the upstream side with respect to the direction of film feeding by the amount of overrun when feeding of the film is stopped, the photographing frame can be fed to a predetermined photographing position accurately.

Also, in the third embodiment, since the amount of shift of the perforation is the maximum value which can be permitted in the positional relation between the perforations and the photographing frame, even when the amount of overrun when feeding of the film is stopped varies due to a change in the power voltage or ambient temperature, the photographing frame can be fed to a predetermined photographing position accurately.

In the fourth embodiment of the present invention, when the perforation has been detected, feeding of the film is stopped by performing braking. Concurrently with this, the magnetic clock data on the film is reproduced and counted, and the counted value is output in the form of the amount of overrun of the film. Consequently, whether the perforation detecting device has been mounted at a correct position can be readily checked. As a result, setting accuracy of the photographing frame to the photographing position can be improved.

Figure 25:
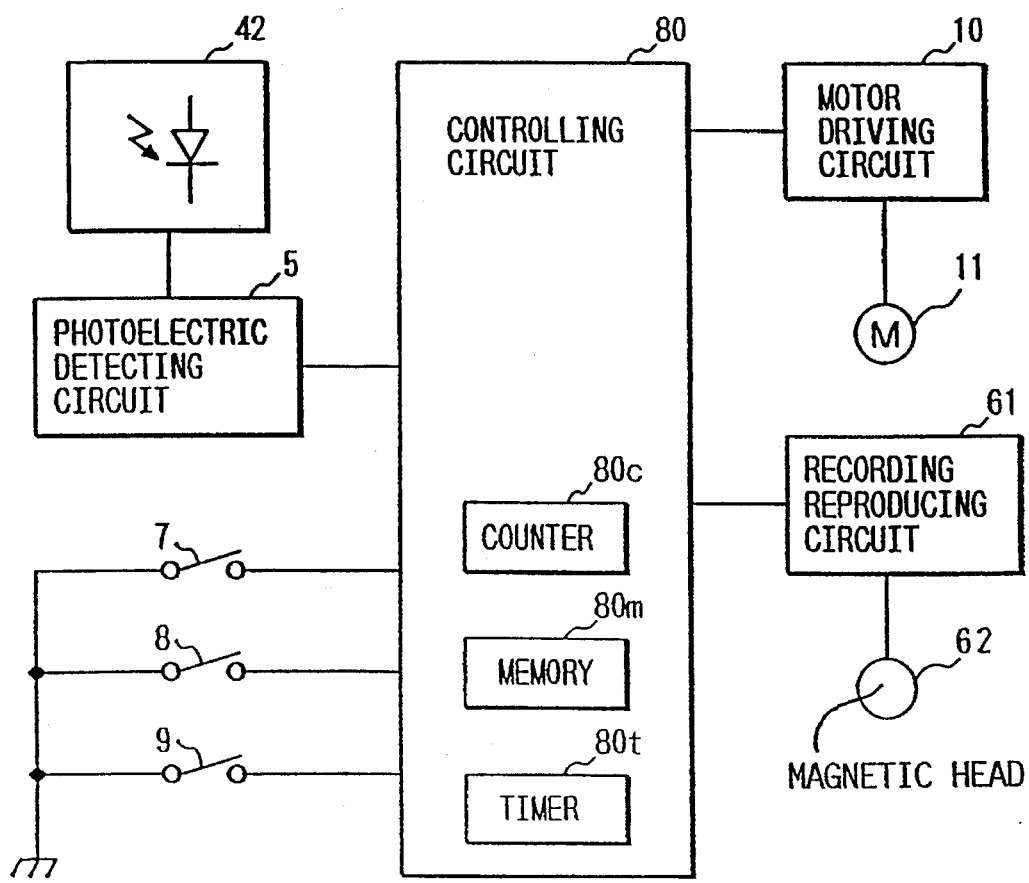
FIG. 25 is a diagrammatic view showing the structure of a fifth embodiment of the present invention.

FIG. 25 is a block diagram of a fifth embodiment of the present invention.

A photoelectric conversion circuit 5 detects perforations on the film by means of the photoelectric conversion device 42, such as a photo-reflector. The photoelectric conversion device 42 is disposed at a position which deviates from the reference position on the upstream side with respect to the direction of film feeding by the amount of overrun generated when feeding of the film fed at a normal feeding speed is stopped. The film feeding motor 11 is driven by the motor driving circuit 10. The recording/reproduction circuit 61 records data on a magnetic recording medium coated on the film by means of a magnetic head 62 or reproduces data recorded on the magnetic recording medium. A control circuit 80, including the microcomputer, a counter 80c, a memory 80m and a timer 80t, controls feeding of the film.

Figures 26, 27:
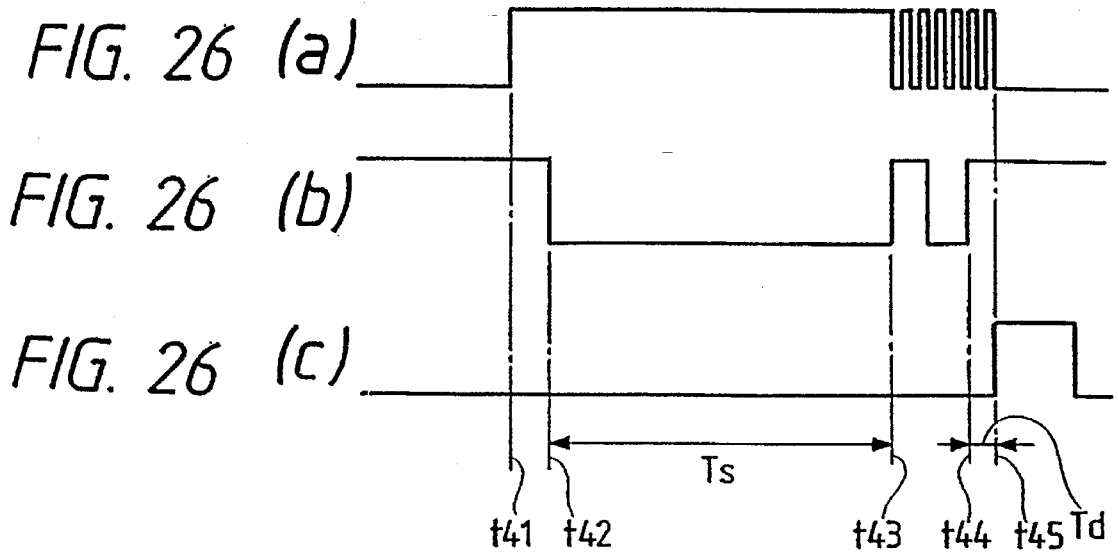
FIG. 26 is a time chart showing the signal waveforms of the individual components of the device shown in FIG. 25 when the film is fed.
FIG. 27 shows a selection table of delay time Td for braking with respect to a film feeding time Ts.

FIG. 26 (a) shows the driving output waveform of the motor 11, FIG. 26(b) shows the perforation detecting waveform of the photoelectric conversion device 42, and FIG. 26(c) shows the brake operation waveform.

The camera having a film feed/stop adjusting device according to the present invention employs the film 1, shown in FIG. 1, in which each photographing frame has two perforations. A delay time Td after the perforation to be detected secondly, i.e., the perforation 4a of the subsequent photographing frame 4, has been detected at time t44, braking is initiated, as shown in FIG. 26. This delay time Td is selected from the selection table stored in the memory 80m shown in FIG. 27 in accordance with the feed time Ts from time t42 at which the perforation detecting waveform falls after feeding of the film is initiated to time t43 at which the perforation 3b is detected. The longer the feed time Ts, the slower the film feeding speed and, hence, the smaller the amount of overrun when the film feeding is stopped. Therefore, the delay time Td is made long. Conversely, the shorter the feed time Ts, the faster the film feeding speed and, hence, the larger the amount of overrun when the film feeding is stopped. Consequently, the delay time Td is made short.

Figure 28:
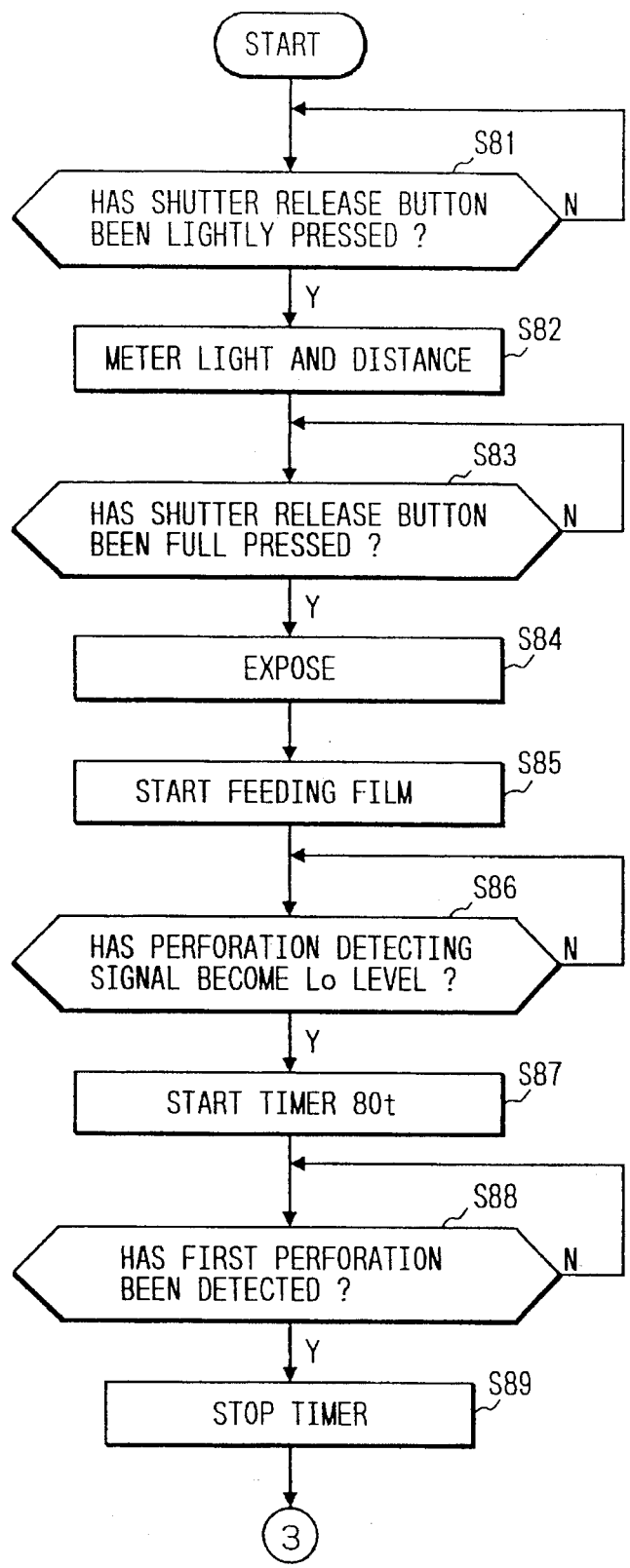
FIG. 28 is a flowchart showing the control program for controlling film feeding.
Figure 29:
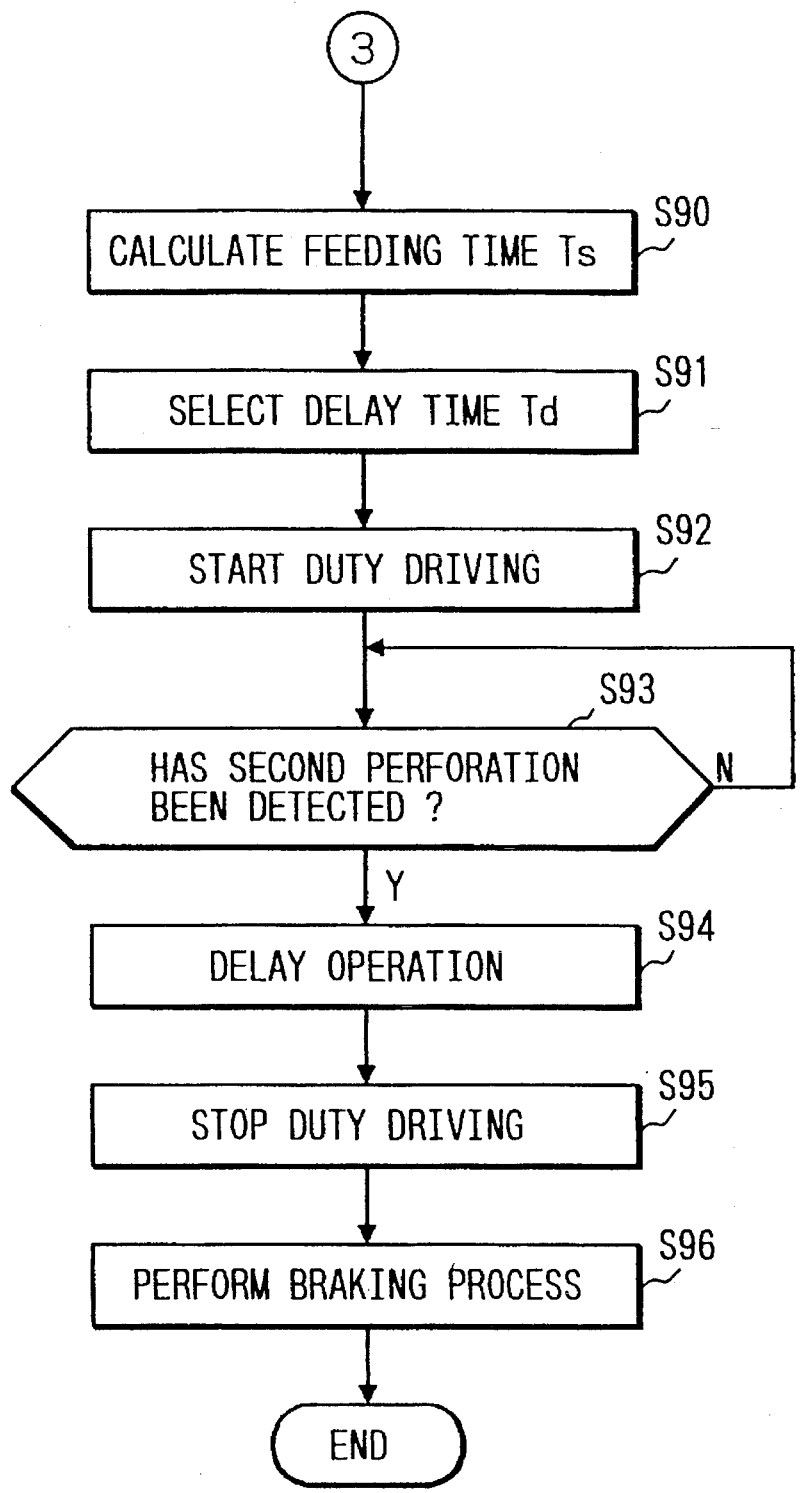
FIG. 29 is a flowchart showing the control program for controlling film feeding.

FIGS. 28 and 29 are flowcharts showing the control program executed by the control circuit 80. The operation of the fifth embodiment will be described below with reference to FIGS. 28 and 29 with the assumption that the photographing frame 3 is at the reference position, as shown in FIG. 1.

In step S81, it is determined by means of the switch 7 whether or not the shutter release button has been pressed slightly. If the shutter release button has been pressed slightly, light and distance are metered in step S82. Next, in step S83, it is determined by means of the switch 8 whether or not the shutter release button has been pressed fully. If the shutter release button has been pressed fully, exposure is performed in step S84. After exposure of the photographing frame 3 has been completed, feeding of the film is initiated by controlling the motor driving circuit 10 (at time t41 of FIG. 26) in step S85. Thereafter, in step S86, it is determined whether or not the perforation 3a has passed the detection position P.S and the perforation detecting waveform has fallen. If the perforation detecting waveform has fallen, the timer 80t is started and counting of the feed time Ts is initiated in step S87 (at time t42 in FIG. 26). In step S88, it is determined whether or not the perforation to be detected first, i.e., the second perforation 3b of the photographing frame 3, has been detected. If the perforation 3b has been detected, the timer 80t is stopped in step S89 (at time t43 in FIG. 26).

Next, in step S90 shown in FIG. 29, the feed time Ts (t43-t42) is calculated from the results of the counting made by the timer 80t. Next, in step S91, the delay time Td is selected from the selection table for the delay time Td which is stored in the memory 80m on the basis of the calculated feed time Ts, and then duty driving of the motor 11 is initiated in step S92. In step S93, it is determined whether or not the perforation to be detected secondly, i.e., the first perforation 4a of the subsequent photographing frame 4, has been detected. If the first perforation 4a has been detected, awaiting is conducted for the selected delay time Td. After the delay time Td has passed, duty drive of the motor 11 is stopped in step S95, and then braking is performed in step S96.

Thus, braking is not initiated immediately after the perforation indicating the objective film stopping position has been detected, but the delay time Td for stopping each of the photographing frames at the reference position is selected from the previously prepared selection table thereof on the basis of the feed time Ts measured in each film feeding operation, and braking is initiated at this delay time Td after detection of the perforation. Consequently, the amount of overrun when feeding is stopped is maintained constant even when the feeding speed varies due to a change in the battery voltage or ambient temperature, and each of the photographing frames can thus be stopped at a predetermined photographing position accurately.

In this embodiment, the selection table for the delay time Td is stored in the memory 80*m*. However, the delay time Td may be calculated more accurately on the basis of the characteristic function thereof with respect to the feed time Ts which is experimentally obtained.

Furthermore, selection of the delay time Td is made on the basis of the feed time Ts. However, even when the feed time Ts remains the same, dynamic characteristics of the film feeding mechanism may vary due to the ambient temperature. Hence, the selected delay time Td may be corrected in accordance with the ambient temperature. Furthermore, since the feed speed varies as the diameter of the film increases, the delay time Td may be corrected in accordance with the diameter of the film.

Next, a sixth embodiment in which the amount of overrun when feeding of the film is stopped is measured and the delay time Td stored in the memory 80*m* is corrected in accordance with this amount of overrun will be described below. This amount of overrun is obtained by reproducing the magnetic clock data recorded on the magnetic recording medium on the film 1 shown in FIG. 1 at the same intervals at a recording density of, for example, 10 bits/mm by means of the recording/reproducing circuit 61 and the magnetic head 62 and by counting the reproduced clock data by means of the counter 80*c* immediately after braking is performed. In the sixth embodiment, the film feed/stop adjusting device used in the fifth embodiment, shown in FIG. 25, is used.

Figure 30:
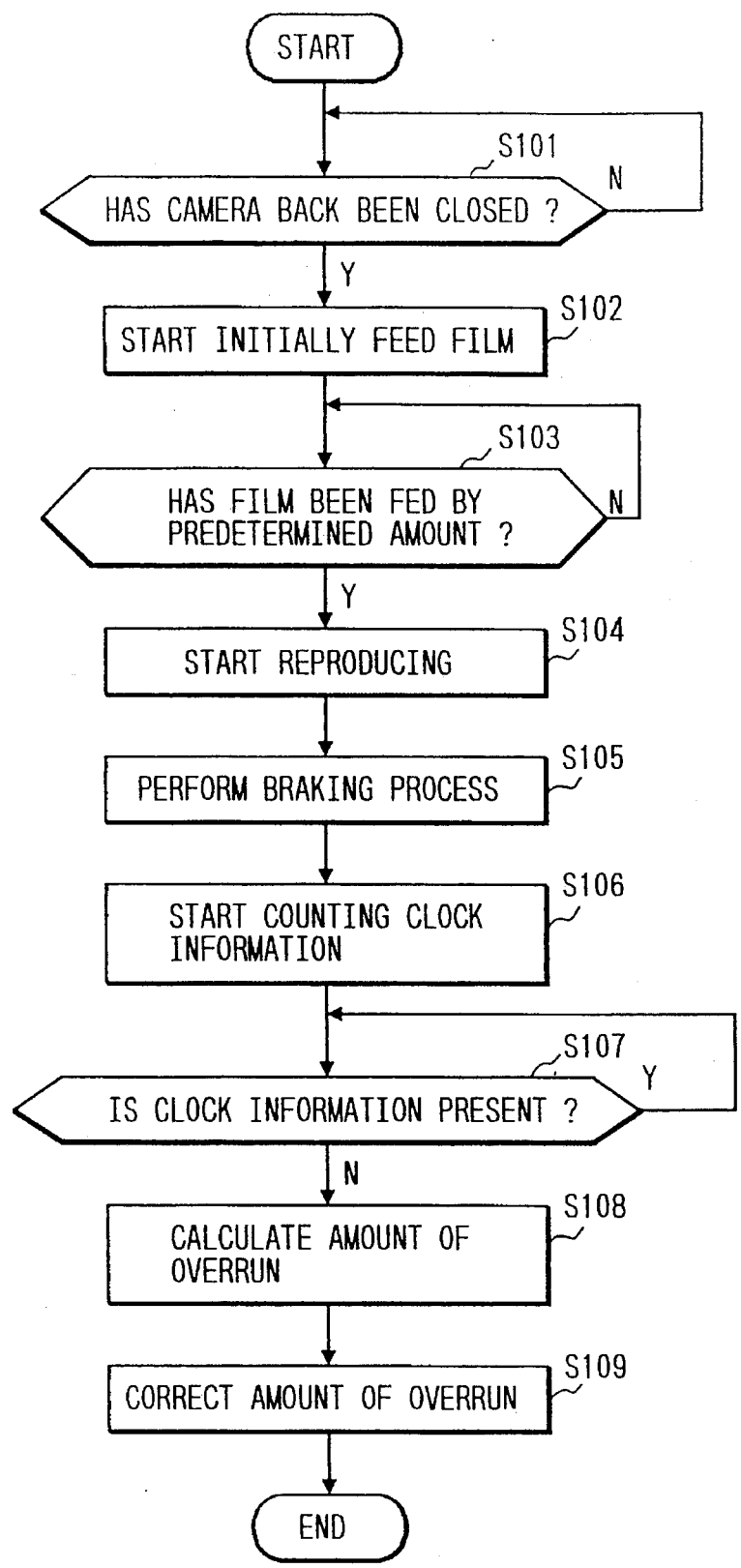
FIG. 30 is a flowchart showing a control program executed in a sixth embodiment of the present invention.

FIG. 30 is a flowchart showing the initial feed control program executed by the control circuit 80. The operation of the sixth embodiment will be described below with reference to FIG. 30.

In step Si01, it is determined by means of the switch 9 whether or not the rear cover of the camera has been closed. If the rear cover has been closed, initial feeding of the film after the film has been mounted is initiated in step S102. Next, in step S103, it is determined whether or not the film has been fed by a predetermined amount. If the film has been fed by a predetermined amount, the magnetic clock data is reproduced by the magnetic head 62 which is brought into contact with the magnetic recording medium on the film 1 in step S104. Thereafter, in step S105, braking is performed, and then counting of the clock data by the counter 80*c* is initiated in step S106.

In step S107, it is determined whether or not the clock data is present. If no clock data is present, it can be said that the film has completely stopped. Thus, the amount of overrun is calculated from the counted value of the counter 80*c* in step S108. That is, since the magnetic clock data on the film is recorded at the same intervals at a density of, for example, 10 bits/mm, the amount of overrun can be calculated on the basis of the counted value of the clock data which counting begins immediately after braking is initiated. Next, in step S109, the delay time Td stored in the memory 80*m* shown in FIG. 27 is corrected on the basis of the calculated amount of overrun. That is, since the dynamic characteristics of the film feeding mechanism varies depending on an individual camera, even when the film feed time Ts remains the same, the amount of overrun varies. Therefore, the delay time Td is corrected on the basis of the actually measured amount of overrun.

Thus, the amount of overrun is actually measured when initial feeding of the film is stopped which is conducted after the film has been loaded, the delay time Td at which braking is initiated is corrected on the basis of the results of the measurement of the amount of overrun. Consequently, even when the dynamic characteristics of the film feeding mechanism varies depending on an individual camera or even when different type of film is used, the amount of overrun when the film feeding is stopped is maintained constant, and each of the photographing frames can thus be stopped at a predetermined photographing position accurately.

In the sixth embodiment, correction of the delay time Td is conducted when the film is initially fed. However, it may be conducted during the manufacturing process of the camera. Furthermore, in the sixth embodiment, the delay time Td stored in the memory 80*m* is corrected on the basis of the amount of overrun measured when initial feeding of the film loaded in the camera is stopped. However, the delay time Td used to stop the photographing frame at the reference position may be directly obtained on the basis of the amount of overrun actually measured when the initial feeding of the film is stopped. Furthermore, the delay time Td used to stop a subsequent photographing frame may be obtained on the basis of the amount of overrun actually measured each time feeding of the film is stopped.

Furthermore, the film feed/stop adjusting device according to the present invention can also be applied to a prewinding type camera in which the loaded film is wound to its end around a spool prior to the photographing operation and the wound film is rewound in a film cartridge in each photographic operation. In that case, the amount of overrun is measured and correction of the delay time Td in the sixth embodiment is conducted when the film is rewound through a single frame after the film has been wound to its end around the spool and then fed excessively through another one frame.

Furthermore, in the sixth embodiment, a film in which two perforations are provided for each of the photographing frames thereof is used. However, the number of perforations for each photographing frame may be one, three or more than three.

In the fifth and sixth embodiments, the photoelectric conversion circuit 5 and the photoelectric conversion device 42 in combination form the perforation detecting device, the motor driving circuit 10 and the film feed motor 11 in combination form the film feeding device, the recording/reproducing circuit 51 and the magnetic head 62 in combination form the reproducing device, the counter 80*c* forms the counting device, the timer 80*t* forms the counting device, and the control circuit 80 forms the stopping signal generating device and control device.

As will be understood from the foregoing description, in the fifth embodiment of the present invention, a time which is delayed from the detection of the perforation by a predetermined amount is obtained on the basis of the results of the measurement of the film feeding time, and feeding of the film is stopped at the obtained time. Consequently, even when the film feeding speed varies due to a change in the battery voltage or ambient temperature, the amount of overrun when the film feeding is stopped is maintained constant, and each of the photographing frames can thus be stopped at a predetermined photographing position accurately.

In the sixth embodiment of the present invention, the clock data recorded on the magnetic recording medium on the film is counted when the film feeding is stopped, and a time which is delayed from detection of the perforation by a predetermined amount is obtained on the basis of the results of the counting. Feeding of the film is stopped at the obtained time. Consequently, even when dynamic characteristics of the film feeding mechanism vary depending on an individual camera or even when a different type of film is used, the amount of overrun when the film feeding is stopped is maintained constant, and each of the photographing frames can thus be stopped at a predetermined photographing position accurately.

What is claimed is:

1. A film feeding cessation device for a camera, comprising:

film feeding means for feeding a film in which each frame has only two perforations, said two perforations being spaced in a longitudinal direction of the frame and being positioned adjacent to respective ends of the frame;

first perforation detection means for detecting perforations provided in the film;

second perforation detection means provided upstream of said first perforation detection means with respect to a direction in which the film is fed for detecting the perforations; and control means for decreasing a film feeding speed of said film feeding means when said second perforation detection means detects a predetermined perforation and for stopping film feeding of said film feeding means when said first perforation detection means detects a predetermined perforation.

2. A film feeding cessation control device according to claim 1, wherein said predetermined perforation detected by said second perforation detection means and said predetermined perforation detected by said first perforation detection means are the same perforation.

3. A film feeding cessation control device according to claim 2, wherein said same perforation is a perforation at a leading end of a frame.

4. A film feeding cessation device, comprising:

a film feeding device which feeds a film in which each frame has only two perforations, said two perforations being spaced in a longitudinal direction of the frame and being positioned adjacent to respective ends of the frame;

a first perforation detection device which detects perforations provided in the film;

a second perforation detection device provided upstream of said first perforation detection device with respect to a direction in which the film is fed for detecting the perforations; and a controlling circuit which decreases a film feeding speed of said film feeding device when said second perforation detection device detects a predetermined perforation and which stops film feeding of said film feeding device when said first perforation detection device detects a predetermined perforation.

5. A film feeding cessation method comprising:

feeding a film in which each frame has only two perforations, said two perforations being spaced in a longitudinal direction of the frame and being positioned adjacent to respective ends of the frame;

detecting perforations of the film at a first location relative to the film;

detecting perforations of the film at a second location upstream of said first location with respect to a direction in which the film is fed;

decreasing a film feeding speed when the detecting at said first location detects a predetermined perforation; and stopping film feeding when the detecting at said second location detects a predetermined perforation.

* * * * *